(12) United States Patent
Saito et al.

(10) Patent No.: US 9,580,034 B2
(45) Date of Patent: Feb. 28, 2017

(54) STEERING WHEEL

(71) Applicant: NIHON PLAST CO., LTD., Fujinomiya-shi, Shizuoka (JP)

(72) Inventors: Hideaki Saito, Fujinomiya (JP); Tsuyoshi Watanabe, Fujinomiya (JP); Mamoru Takagi, Fujinomiya (JP); Takashi Mitobe, Fujinomiya (JP); Yohei Kiuchi, Fujinomiya (JP)

(73) Assignee: Nihon Plast Co., Ltd., Shizuoka (JP)

( * ) Notice: Subject to any disclaimer, the term of this patent is extended or adjusted under 35 U.S.C. 154(b) by 0 days.

(21) Appl. No.: 14/660,684

(22) Filed: Mar. 17, 2015

(65) Prior Publication Data

US 2015/0266442 A1    Sep. 24, 2015

(30) Foreign Application Priority Data

Mar. 18, 2014  (JP) ................................ 2014-055470
Dec. 26, 2014  (JP) ................................ 2014-266284

(51) Int. Cl.
*B60R 21/203*   (2006.01)
*B60Q 5/00*    (2006.01)
*B60R 21/2165*  (2011.01)

(52) U.S. Cl.
CPC .......... *B60R 21/2037* (2013.01); *B60Q 5/003* (2013.01); *B60R 21/21658* (2013.01)

(58) Field of Classification Search
CPC ............ B60R 21/2037; B60R 21/2035; B60R 21/203; B60R 21/21658; B60Q 5/003
USPC ............................ 280/728.2, 731; 200/61.55
See application file for complete search history.

(56) References Cited

U.S. PATENT DOCUMENTS

2006/0208470 A1    9/2006  Tsujimoto et al.
2009/0315304 A1*  12/2009  Hagelgans .......... B60R 21/2035
                                                  280/728.2
2012/0306184 A1   12/2012  Yamaji et al.

FOREIGN PATENT DOCUMENTS

| DE | 202013002988 U1 | 5/2013 |
| JP | 7-309239 A | 11/1995 |
| JP | 2010-201949 A | 9/2010 |
| JP | 2011-148478 A | 8/2011 |
| JP | 4797584 B2 | 10/2011 |

(Continued)

OTHER PUBLICATIONS

Search Report of United Kingdom Patent Application No. GB1504400.1 dated Aug. 24, 215.

(Continued)

*Primary Examiner* — Keith Frisby
(74) *Attorney, Agent, or Firm* — Arent Fox LLP

(57) ABSTRACT

The present invention provides a steering wheel. Among respective hooks of a module, the hooks being adapted to engage with wires which are disposed in respective opening portions of a steering wheel main body, an adjustment rib which is provided so as to be protrusive to an outer circumferential face of one side hook comes into contact with an inside face of one side opening portion, and restrains a position of such one side hook in such one side opening portion. An adjustment pin which is protrusively provided at a position different from that of the adjustment rib on the outer circumferential face of such one side hook elastically comes into contact with the inside face of such one side opening portion by the adjustment rib coming into contact with the inside face of such one side opening portion.

1 Claim, 16 Drawing Sheets

(56) References Cited

FOREIGN PATENT DOCUMENTS

| JP | 2012-111325 A | 6/2012 |
| JP | 5240126 B2 | 7/2013 |
| WO | WO 2013/051409 A1 | 4/2013 |

OTHER PUBLICATIONS

British Office Action of related British Patent Application No. GB1608672.0 dated Nov. 8, 2016.

* cited by examiner

STEERING WHEEL

CROSS REFERENCE TO RELATED APPLICATIONS

This application claims priority of Japanese Patent Application Nos. 2014-055470 filed on Mar. 18, 2014 and 2014-266284 filed on Dec. 26, 2014. The contents of the preceding applications are incorporated herein by reference in their entirety.

BACKGROUND OF THE INVENTION

1. Field of the Invention

The present invention relates to a steering wheel provided with a plurality of engagement members which are respectively engaged with hooks which are inserted through a plurality of hole portions to thereby support a module with respect to a steering wheel main body.

2. Description of the Related Art

Conventionally, a steering wheel of a motor vehicle has been known that there is provided the one that is configured by mounting a module such as an airbag device provided with: an airbag folded at a boss portion (a boss cored metal) which is a supporting portion constituting a steering wheel main body; an inflator adapted to supply a gas to the airbag; a base plate to which the airbags and the inflator are mounted; and a cover body which is coupled with a base plate and which is adapted to cover the airbag and the inflator.

In addition, as such an airbag device, it has been known that there is employed a construction in which, with respect to snap lock springs (wires) which are U-shaped engagement members respectively disposed at three parts, both side parts and a lower part of through holes provided in the base plate of a case body of the module, a plurality of hooks which are engagement portions provided at the boss portion of the steering wheel main body are respectively pushed into the through holes and then are hooked on the snap lock springs to thereby mount the module to the boss portion with just one touch of a finger.

In a case where such a module is thus mounted to the boss portion with just one touch of a finger, although the module is positioned in a front face to rear face direction with respect to the boss portion by way of engagement between the hooks and the snap lock springs, positioning in the vertical and transverse direction cannot be achieved by way of the engagement therebetween; and therefore, a positioning pin (a locating pin) for the purpose of positioning in these vertical and transverse directions is provided separately from a respective one of the hooks (for example, reference should be made to Japanese Unexamined Patent Application Publication No. 2011-148478).

In recent years, downsizing of an airbag device for steering wheel has made a remarkable progress, and it has been not easy to sufficiently allocate a space for providing a positioning pin.

SUMMARY OF THE INVENTION

The present invention has been made in view of such a circumstance, and it is an object of the present invention to provide a steering wheel which is capable of reliably positioning a module with respect to a steering wheel main body while coping with downsizing of the module.

A steering wheel according to a first aspect of the present invention is provided, and comprises: a steering wheel main body; a module; a plurality of hole portions which are provided at either one of the steering wheel main body and the module; a plurality of hooks which are provided at another of the steering wheel main body and the module and which can be respectively inserted into the hole portions; and a plurality of engagement members which are disposed at the respective hole portions, which are biased in a predetermined direction crossing an insertion direction of the hooks into the hole portions, and which are engaged with the hooks that are inserted into the hole portions so as to retain the hooks to thereby support the module on the steering wheel, wherein the hook that is one of the plurality of hooks comprises: a positioning reference portion which is protrusively provided on an outside face and which comes into contact with an inside face of one of the hole portions so as to restrain a position of one of the hooks at the one hole portion; and a plurality of adjustment portions which is protrusively provided on an outside face at a position different from the positioning reference portion and which elastically comes into contact with the inside face of the one hole portion by the positioning reference portion coming into contact with the inside face of one of the hole portions.

A steering wheel according to a second aspect of the present invention is provided in such a manner that a sum of biasing loads with respect to the plurality of hooks of the plurality of engagement members is substantially 0.

A steering wheel according to a third aspect of the present invention is provided in such a manner that other remaining hooks except one of the plurality of hooks comprise a plurality of adjustment portions which are protrusively provided on the outside face and which elastically come into contact with the inside faces of other remaining hole portions by the positioning reference portion of one of the hooks coming into contact with the inside face of one hole portion.

A steering wheel according to a fourth aspect of the present invention, further comprising: a locking portion which is provided between either of the pair of the hole portions and the pair of the hooks in either one of the steering wheel main body and the module; and a locking receiving portion which is provided in another of the steering wheel main body and the module and which is adapted to engagingly lock the locking portion in the insertion direction of the hooks into the hole portions.

In so far as the steering wheel according to the first aspect of the present invention is concerned, among the plurality of hooks that are inserted into the hole portions and that are retained so as to be engaged with the engagement members, the positioning reference portion that is protrusively provided on the outside face of one hook comes into contact with the inside face of one hole portion. In this manner, the position of one hook at such one hole portion is restrained, and the plurality of adjustment portions that are protrusively provided at positions which are different from that of the positioning reference portion on the outside face of such one hook elastically comes into contact with the inside face of one hole portion by coming into contact with the inside face of one hole portion of the positioning reference portion; and therefore, it becomes possible to integrate respective functions of supporting and positioning the module with each other with respect to the steering wheel main body, and it becomes possible to reliably position the module and the steering wheel main body while coping with downsizing of the module.

In so far as the steering wheel according to the second aspect of the present invention is concerned, the sum of biasing loads of the plurality of engagement members with respect to the plurality of hooks is obtained as being substantially 0. In this manner, it becomes possible to more reliably position the module and the steering wheel main body while coping with downsizing of the module, by way of adjustment of the biasing loads of the engagement members.

In so far as the steering wheel according to the third aspect of the present invention is concerned, the plurality of adjustment portions are protrusively provided on the outside faces of other remaining hooks except one of the plurality of hooks, and these adjustment portions elastically come into contact with the inside faces of other remaining hole portions by coming into contact with the inside face of one hole portion of the positioning reference portion of one hook. In this manner, it becomes possible to reliably whirl-stop the module with respect to the steering wheel main body, and it becomes possible to reliably position the module and the steering wheel main body.

DESCRIPTION OF THE PREFERRED EMBODIMENTS (First Embodiment)

Hereinafter, a steering wheel according to a first embodiment of the present invention will be described with reference to the accompanying drawings.

Figure 7:
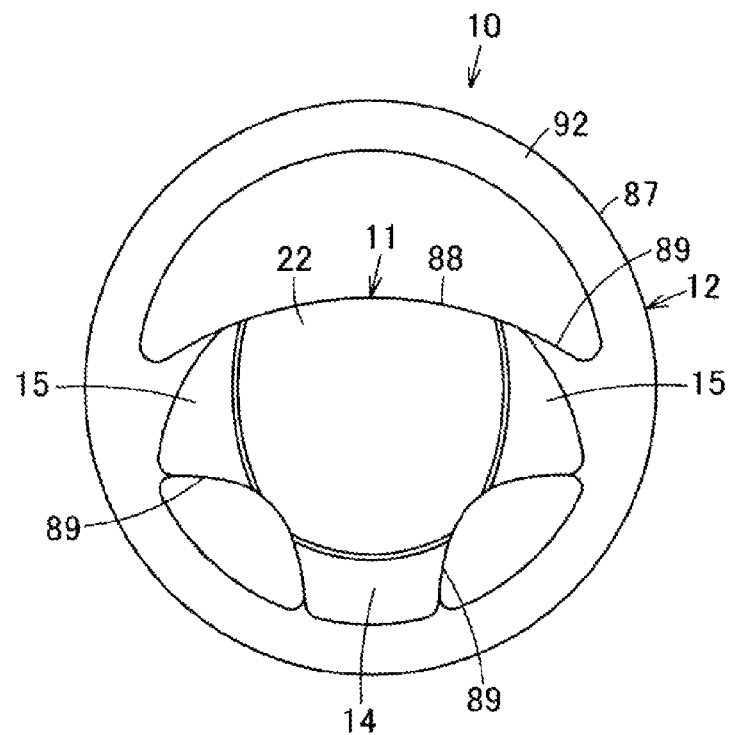
FIG. 7(a) is a plan view showing the same steering wheel as above.
FIG. 7(b) is a side view showing the same steering wheel as above.
Figure 7:
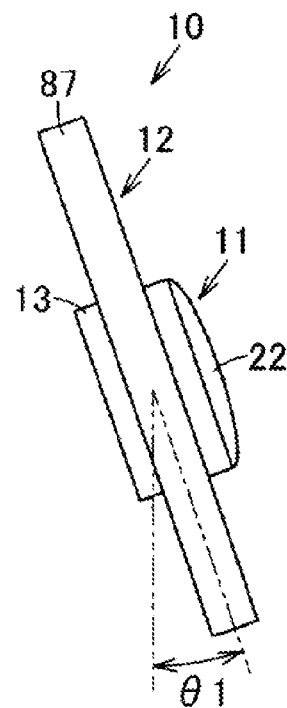

In FIG. 7(a), reference numeral 10 designates a steering wheel serving as a steering wheel, and the steering wheel 10 is disposed on a front side from an occupant at a driver's seat of a motor vehicle, and is composed of: a module 11; a steering wheel main body 12 serving as a steering wheel main body in a case where the module 11 is mounted to the occupant's side; a cover body (a body cover) 13 serving as a covering member which is mounted to the counter-occupant side of the steering wheel main body 12; a finisher (a garnish) 14 serving as a decoration member which is mounted to the occupant's side of the steering wheel main body 12; and operational switching devices 15, 15 of an audio device or the like, in a motor vehicle, although not shown, for example.

It is to be noted that the steering wheel 10 is generally mounted to a steering shaft serving as a steering device, although not shown, the steering device being provided in a state in which the device is inclined at an angle θ1 with respect to a horizontal direction (a perpendicular direction) (FIG. 7(b)), and however, hereinafter, a description will be given on the assumption that: the side of the module 11 is defined as an occupant's side, a front side, or a rear side; the steering wheel side is defined as a vehicle body side, a rear side, or a front side; a forward and backward direction taken along the steering shaft is defined as an axial side; and directions such as the forward and backward direction and a vertical direction are defined with reference to a forward direction of a vehicle body provided with the steering wheel 10.

Figure 5:
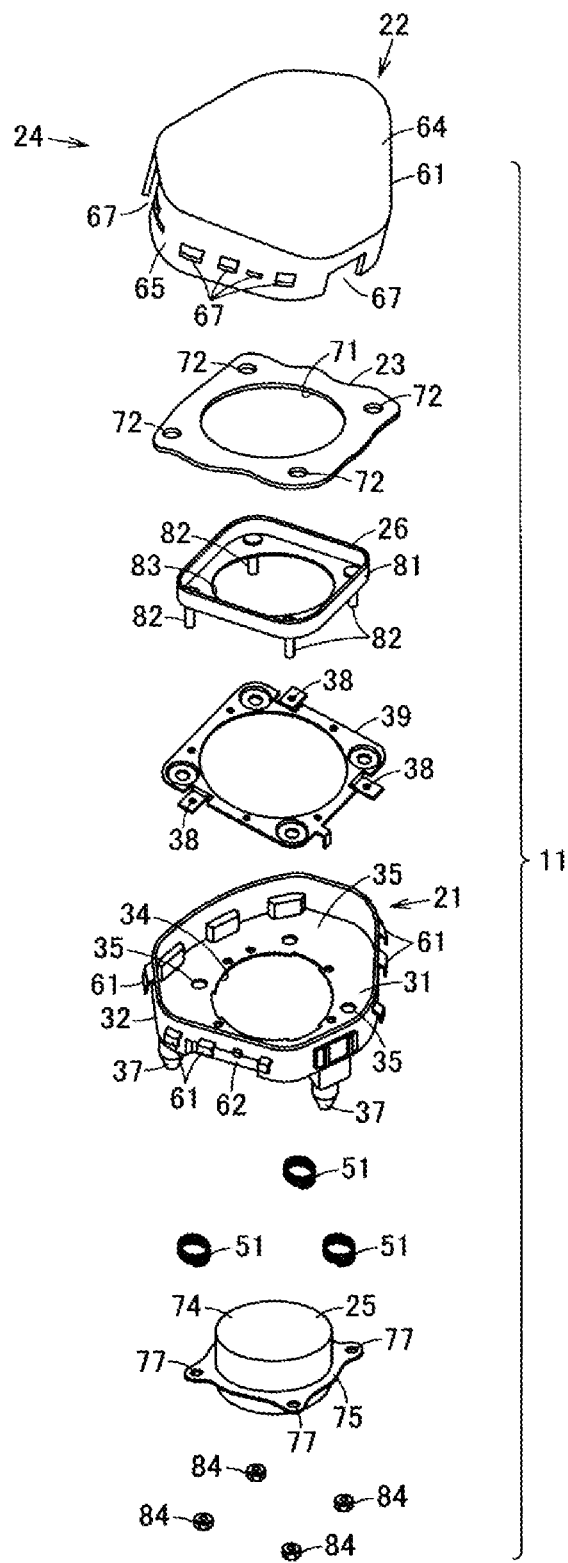
FIG. 5 is an exploded perspective view of the module of the same steering wheel as above.

The module 11 is obtained as an airbag device (an airbag module) provided with: a case 24 provided with a base plate 21 which is a mounting member serving as a housing body and an airbag cover 22 serving as a covering body, the case being adapted to house a folded airbag 23; an inflator 25 which is disposed in the case 24; and a retainer 26 or the like (FIG. 5).

Figure 4:
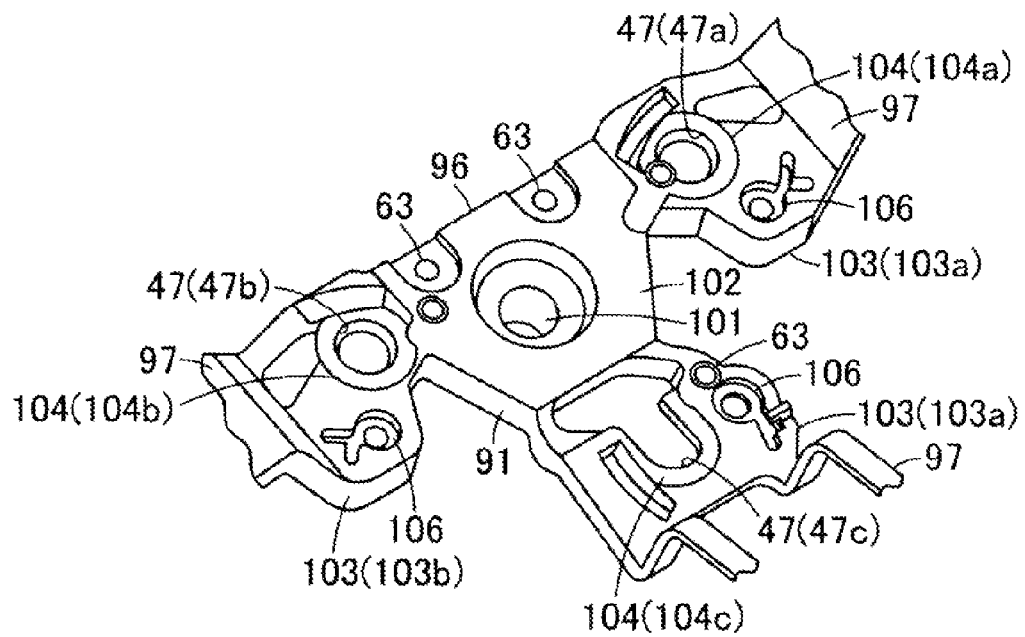
FIG. 4(a) is a perspective view showing a part of a module from a rear side.
FIG. 4(b) is a perspective view showing a part of the steering wheel main body from a front side.
Figure 4:
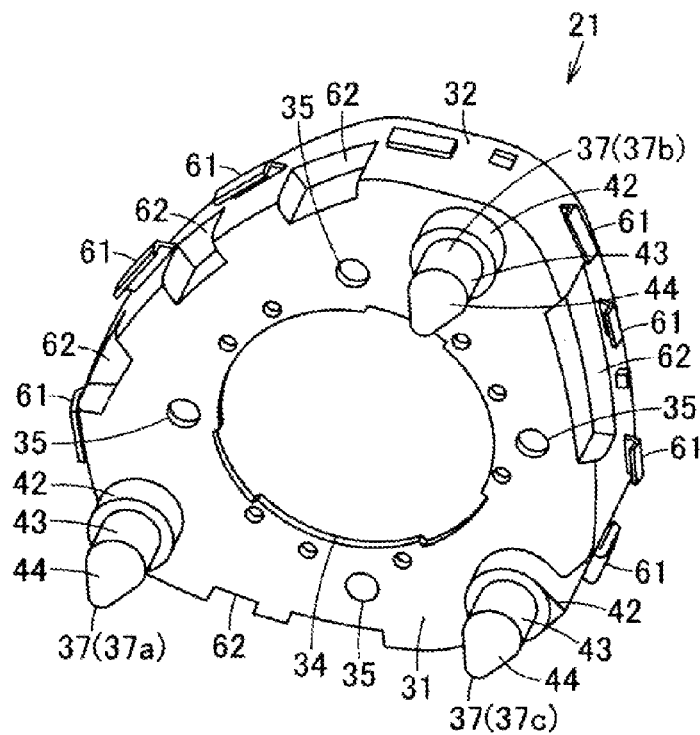

The base plate 21 is also referred to as a back plate or a back holder or the like; the base plate is compatible with a horn plate of a horn mechanism, and the base plate is integrally injection-molded with a synthetic resin, for example. In addition, the base plate 21 is provided with: a board portion 31 which is a mounting surface portion serving as a case main body; and a peripheral wall portion 32 which is erected on a front side all over the peripheral edge part on a surface side of the board portion 31 (FIG. 4(*a*) and FIG. 5).

In the board portion 31, an inflator mounting hole 34 formed in the shape of a circular hole are opened in a substantially center part, and four mounting holes 35 are respectively opened so as to surround the inflator mounting holes 34. In addition, in the board portion 31, a plurality of columnar hooks 37 adapted to retractably mount the module 11 to a steering wheel main body 12 are protrusively provided on a rear side. Further, to the board portion 31, an electrically conducting plate 39 which is electrically conductive and which is adapted to set a movable contact point 38 is integrally mounted.

The hooks 37 are adapted to removably engagingly lock the module 11 and the steering wheel main body 12 and to guide the module 11 along the front face to rear face direction with respect to the steering wheel main body 12. These hooks 37 each are integrally provided with: a columnar receptacle portion 42 which is provided so as to be protrusive from the substrate 31 and which forms a proximal end side; a columnar hook main body portion 43 which is smaller in diametrical dimension than the receptacle portion 42 and which is protrusively provided so as to be coaxial to the receptacle portion 42; and a conical insertion portion 44 which is provided so as to be coaxial to a tip end part of the hook main body portion 43. In addition, these hooks 37 are such that the hook main body portion 43 and the insertion portion 44 are inserted into opening portions 47 serving as hole portions of the steering wheel main body 12, which will be described later, and are elastically engagingly locked with and retained by wires 48 serving as an engagement members respectively mounted to these opening portions 47. In the embodiment, in these hooks 37, there are set a pair of hooks 37*a*, 37*b* which are first hooks (one side and another side of hooks) positioned at both upper side parts and a lower hook 37*c* which is a second hook positioned at a lower center part.

The receptacle portion 42 is adapted to retain one end part (a rear end part) of a horn spring 51 which is a coil spring adapted to bias the module 11 to a rear side (the occupant's side) with respect to the steering wheel main body 12, and a plurality of engagingly locking claw portions 52 for engagingly locking the horn spring 51 are protrusively provided in a radial direction.

Figure 2:
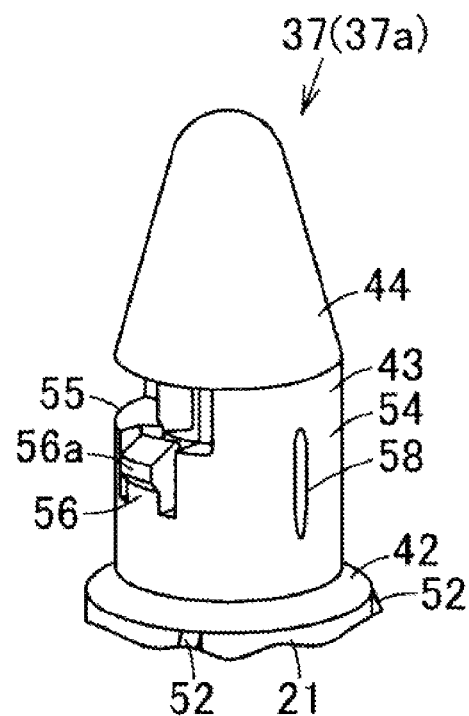
FIG. 2(a) is a perspective view showing a part of one hook.
FIG. 2(b) is a perspective view showing a part of another hook.
Figure 2:
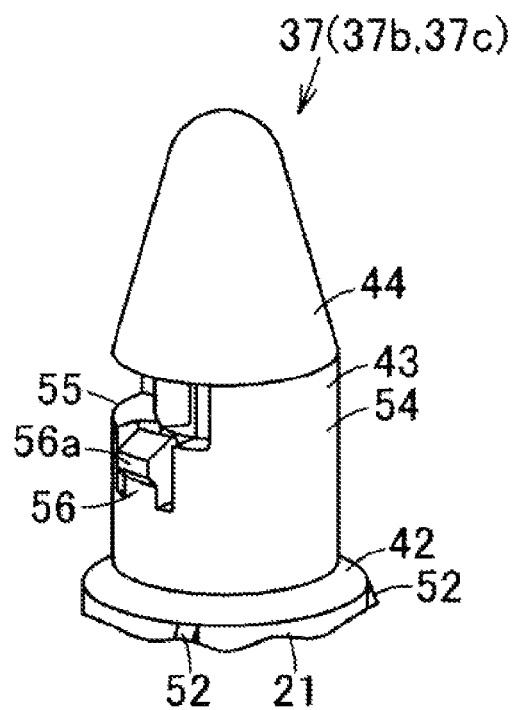

In the hook main body portion 43, another end part (a front end part) of the horn spring 51 is positioned around the side of the receptacle portion 42 that is a proximal end side. Further, the hook main body portion 43 is a portion which includes the insertion portion 44 and in which a tip end side (a front end side) more significantly than such another end part of the horn spring 51 is to be inserted into the opening portion 47 of the steering wheel main body 12. In addition, an outer circumferential face 54 of the hook main body portion 43, which is an outside face of a hook 37 is spaced from an inside face of the opening portion 47; and on the outer circumferential face 54, a pair of locking recessed portions 55, 55 with which the wire 48 is to be engagingly locked are provided in a recessed manner so as to be adjacent to a proximal end of the insertion portion 44; and further, adjustment pins 56, 56 serving as adjustment portions are provided so as to face these locking recessed portions 55, 55 (FIG. 2(*a*) and FIG. 2(*b*)). On the other hand, among the hooks 37, at one side hook 37*a* which is a hook, in addition to the locking recessed portions 55, 55 and the adjustment pins 56, 56, an adjustment rib 58 serving as a positioning reference portion is provided along an axial direction at a position which is different from those of the adjustment pins 56, 56, on the outer circumferential face 54 of the hook main body portion 43 (FIG. 2(*a*)). Therefore, in so far as the hooks 37 are concerned, one side hook 37*a* serves as a positioning hook, and another side hook 37*b* and lower hook 37*c* each serve as a general hook.

The locking recessed portions 55, 55 are provided in a recessed manner in an axial perpendicular direction with respect to the outer circumferential face 54 of the hook main body portion 43. The locking recessed portions 55, 55 of the respective hooks 37 are disposed on both sides, that is, so as to be linearly symmetrical to each other, with respect to a direction facing a gravity (a center) of a virtual triangle T connecting center axes of the respective hooks 37 when seen in the front face to rear face direction. Therefore, the locking recessed portions 55, 55 are positioned on an upper side and another lower side of the outer circumferential face 54 of the hook main body portion 43, in the respective side hooks 37*a*, 37*b*, and are positioned at both side parts of the outer circumferential face 54 of the hook main body portion 43, in the lower hook 37*c*.

The adjustment pins 56, 56 are adapted to adjust positions of the respective hooks 37 of the respective opening portions 47, and are positioned at a proximal end side of the hook main body portion 43 more significantly than the respective locking recessed portions 55, 55, a tip end part of which is positioned in the locking recessed portions 55, 55. These adjustment pins 56, 56 each are formed in the shape of a tongue which is provided so as to be elastically deformable in an axial perpendicular direction (a radial direction) of the hook main body portion 43 of the hook 37, and at a tip end part, there are provided claw portions 56*a*, 56*a*, a respective one of which protrudes to the outside in the axial perpendicular direction more significantly than the outer circumferential face 54 of the hook main body portion 43. In addition, in so far as the adjustment pins 56, 56 are concerned, these claw portions 56*a*, 56*a* are respectively capable of elastically coming into contact (abutment) with the inside faces of the opening portions 47.

The adjustment rib 58 serves as a reference which comes into contact (abutment) with the inside face of the opening portion 47 to thereby restrain the position of one side hook 37*a* in the vertical and transverse directions and then position the module 11 in the vertical and transverse directions with respect to the steering wheel main body 12; the adjustment rib protrudes to the axial perpendicular direction (the radial direction) from the outer circumferential face 54 of the hook main body portion 43 of the one side hook 37*a*; and the adjustment rib is formed in a longitudinal shape along the axial perpendicular direction, that is, along the direction of insertion into the opening portion 48 of the hook 37. Thus, the adjustment rib 58 is adapted to maintain contact with the inside face of the opening portion 47 in a state in which the module 11 is mounted by operation of a horn device or the like in the front face to rear face direction with respect to the steering wheel main body 12. The adjustment rib 58 is set so as to be larger in length in the longitudinal direction than the protrusion quantity in the axial direction from the outer circumferential face 54 of the hook main body portion 43. In addition, the position of the adjustment rib 58 is set at a position at which a phantom line L1 connecting a center axis of the one side hook 37*a* and the gravity (the center) of the virtual triangle T (T1) to each other and the outer circumferential face 54 cross each other, in the hook main body portion 43 of one side hook 37*a* when seen in the front face to rear face direction. That is, in the one side hook 37*a*, the adjustment rib 58 is positioned so as to be opposite to the adjustment pins 56, 56 with respect to a phantom line L2 which passes through the center axis and which is orthogonal to the phantom line L1.

An insertion portion 44 is formed so as to easily insert the hook 37 into the opening portion 47 and so as to be gradually reduced in diameter from a proximal end side which is the side of the hook main body portion 43 to a tip end side.

Movable contact points 38 are respectively opposed to fixed contact points 63 of a horn mechanism which is disposed on the side of the steering wheel main body 12 which will be described later, and constitute a horn switch together with these fixed contact points 63. That is, the movable contact points 38 are respectively positioned at both side parts and a lower part of the board portion 31 of the base plate 21.

The electrically conductive plate 39 is formed in the shape of a plate by an electrically conductive metal or the like. It is to be noted that the electrically conductive plate 39 may be fixed to the board portion 31 by way of claws or the like, or alternatively, when the base plate 21 is molded, the plate is insertion-molded, whereby a portion except the movable contact point 38 may be embedded in the board portion 31.

The peripheral wall portion 32 is adapted to surround the airbag 23 in its folded state, and is positioned in a direction taken along the protrusion direction of the airbag 23. In addition, at the outside of the peripheral wall portion 32, a plurality of hook portions 61 and a plurality of locking receiving portions 62 for engagingly locking and retaining the airbag cover 22 are respectively provided.

On the other hand, the airbag cover 22 is integrally molded with a synthetic resin having its insulation property, and is provided with: a top plate portion 64 serving as cover main body which covers a front side of a part of the steering wheel; and a mounting plate portion 65 serving as a mounting wall portion which is provided so as to be protrusive to a lower side in a rectangular cylinder shape from a front side which is a rear side of the top plate portion 64.

On a front face which is the rear face of the top plate portion 64, at a position which is surrounded by the mounting plate portion 65, a tear line which is a tear-off target portion, although not shown, the tear line being formed in the shape of a small groove in a thickness dimension, is formed in a substantial H-shape in a planar view, for example, and at the time of inflation of the airbag, the airbag is configured to cleave and expand along the tear line by way of an expansion pressure of the airbag.

The mounting plate portion 65 is positioned outward of the peripheral wall portion 32 of the base plate 21, and is formed along an external shape of the peripheral wall portion 32. Further, at the mounting plate portion 65, there are respectively provided: insertion opening portions 67 which the hook portions 61 of the base plate 21 are respectively inserted into and then engaged with; and engagingly locking protrusions, although not shown, which are respectively engaged with the respective locking receiving portions 62.

The airbag 23 is formed in the shape of a flat bag by single or a plurality of base cloths, for example, and as is the case with the board portion 31 of the base plate 21, an inflator mounting hole 71 and four mounting holes 72 formed in shapes of circular holes are provided so as to surround the inflator mounting hole 71 are formed.

The inflator 25 is provided with: a disk-shaped inflator main body portion 74; and a flange portion 75 which is provided so as to be protrusive from the inflator main body portion 74 to the outer circumferential side. In addition, at the inflator main body portion 74, a gas injection nozzle, although not shown, is provided, and in the flange portion 75, four mounting holes 77 are provided. Further, at a bottom part of the inflator main body portion 74, a contact point portion, although not shown, is provided. To the contact point portion, a wire harness is connected via a connector, although not shown, and via the wire harness, the inflator 25 is electrically connected to a control device.

The retainer 26 is formed in the shape of a ring, and is provided with: a retainer base portion 81 which is formed of a metal plate or the like; and four mounting bolts 82 which are fixed to the retainer base portion 81. Also, in the retainer base portion 81, an inflator mounting hole 83 formed in the shape of a circular hole is shaped at a center part. In addition, the mounting bolts 82 are protrusively provided on the rear side so as to surround the inflator mounting hole 83, and the nuts 84 are respectively screwed.

Also, the retainer 26 is inserted into the airbag 23, and the airbag 23 is folded in a predetermined shape in a state in which the mounting bolts 82 of the retainer 26 are respectively pulled out from the mounting holes 72. Further, the folded airbag 23 is covered with the airbag cover 22, and the insertion opening portion 67 and an engagingly locking protrusion of the mounting plate portion 65 of the airbag cover 22 are pushed against the side of the base plate 21 while the protrusion is positioned at the hook portion 61 and the locking receiving portion 62 of the peripheral wall portion 32 of the base plate 21 with the mounting bolts 82 of the retainer 26 being inserted into mounting holes 35. In this manner, the hook portion 61 is inserted into and then engagingly locked with the insertion opening portion 67, and the engagingly locking protrusion is inserted into and engagingly locked with the locking receiving portion 62 and then the airbag cover 22 and the base plate 21 are fixed to each other with just one touch of a finger (snap-in).

Further, while the mounting bolts 82 that protrude to the rear side of the base plate 21 are inserted into the mounting holes 77, the inflator 25 is combined from the rear side of the bas plate 21, and the nuts 84 are screwed and tightened with the mounting bolts 82. In this state, a portion on the front side of the inflator main body portion 74 in which the gas injection nozzle of the inflator 25 has been provided is inserted into the airbag 23 through the inflator mounting hole 34, and the module 11 is constructed.

Figure 6:
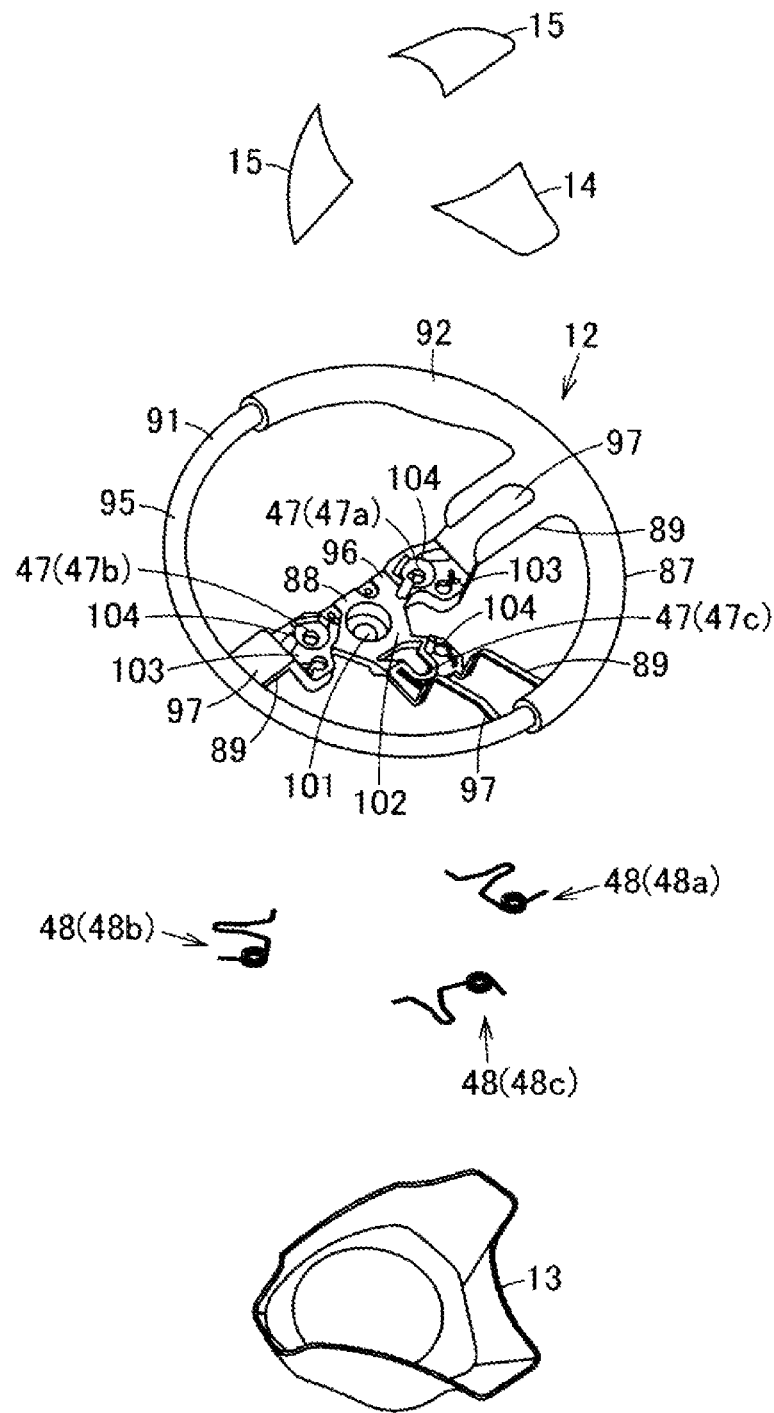
FIG. 6 is an exploded perspective view of the same steering wheel as above.

On the other hand, the steering wheel main body 12 is composed of: a rim portion (a ring portion) 87 formed in the shape of a circular ring; a boss portion (a mounting portion) 88 which is provided inside of the rim portion 87; and a plurality of, for example, in the embodiment, three spoke portions 89 which connect these rim portion 87 and the boss portion 88 (FIG. 4(b) and FIG. 6).

Also, the steering wheel main body 12 is provided with: a metal-based cored bar 91; a soft covering portion 92 which integrally covers a part of the cored bar 91, and a rear side of the cored bar 91 is covered with the cover body 13.

The cored bar 91 corresponds to the rim portion 87, the boss portion 88, and the spoke portion 89; the cored bar is provided with: a rim cored bar 95; a boss cored bar 96 serving as a supporting portion; and a spoke cored bar 97 serving as a coupling portion; and the cored bar is formed so as to be substantially transversely symmetrical as a whole.

The boss cored bar 96 is also referred to as a boss plate or a hub core or the like, and is provided with: a boss cored bar main body 102 integrally having, at a center part, a cylindrical boss 101 which is engagingly fitted to the steering shaft; coupling cored bars 103 respectively adapted to couple the boss cored bar main body 102 and a respective one of spoke cored bars 97; and fixing portions 104 provided at these coupling cored bars 103.

The coupling cored bars 103 are respectively protrusively provided at both upper side parts and a lower center part of the boss cored bar main body 102. That is, at the coupling cored bars 103, a pair of side coupling cored bars 103a, 103b which are first coupling cored bars (one and another coupling cored bars) positioned at both side parts and a lower coupling cored bar 103c which is a second coupling cored bar position at a lower part are set.

At the fixing portions 104, there are respectively provided: the opening portion 47; a wire retaining portion 106 serving as an engagingly locking member retaining portion which retains the wire 48 disposed in the opening portion 47; and the fixed contact point 63 constituting a horn switch device. Also, at the fixing portions 104, there are respectively set: a pair of side fixing portions 104a, 104b which are first fixing portions (one and another fixing portions) positioned at a pair of side coupling cored bars 103a, 103b; and a lower fixing portion 104c which is a second fixing portion positioned at the lower coupling cored bar 103c.

The opening portions 47 are provided so as to pass through the boss cored bars 96 in the forward and backward direction which is a thickness direction. In so far as the opening portions 47 are concerned, in the side fixing portions 104a, 104b, there are formed a pair of side opening portions 47a, 47b which are first opening portions (one and another opening portions) each formed in the shape of a circular hole, and in the lower fixing portion 104c, there are formed a lower opening portion 47a which is a semicircular second opening portion, a lower side of which is not opposed to the side opening portions 47a, 47b is formed in the shape of an arc. That is, in so far as a respective one of the opening portions 47 is concerned, an inside face of at least a part thereof is formed along the arc. Also, the side hooks 37a, 37b in the hooks 37 are respectively inserted into the side opening portions 47a, 47b, and a lower hook 37c in the hooks 37 is inserted into the lower opening portion 47c.

Figure 3:
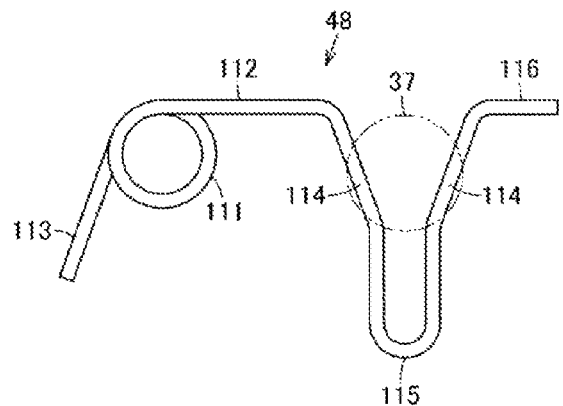
FIG. 3(a) is a plan view showing a natural state of an engagement member of the same steering wheel as above.
FIG. 3(b) is a plan view showing one engagement member in a state in which the engagement member is retained on a steering wheel main body of the same steering wheel as above.
FIG. 3(c) is a plan view showing another engagement member in a state in which the engagement member is retained on a steering wheel main body of the same steering wheel as above.
Figure 3:
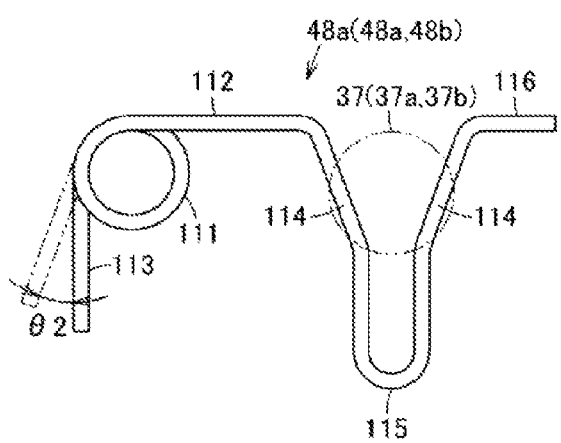
Figure 3:
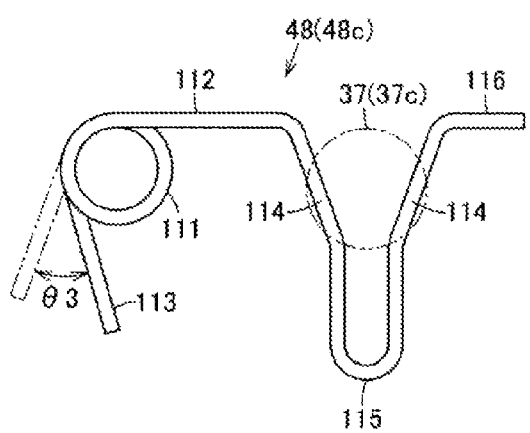

The wire 48 is also referred to as a "one touch" wire, and is formed of a wire rod (a piano wire) such as an elastically deformable metal. In the embodiment, this wire 48 is provided with: a wire main body 111 which is a twisted coil spring and which serves as an engagement member main body wound in a coil shape; a first arm 112 extending from the wire main body 111 in a linear shape along a tangential direction; and a second arm 113 extending in a linear shape along a tangential direction forming an obtuse angle with respect to the first arm 112 from the wire main body 111; at a tip end side of the first arm 112, locking portions 114, 114 respectively adapted to engage with the locking recessed portions 55, 55 of the hooks 37 of the module 11 to thereby engagingly lock the hooks 37 and a removing operation portion 115 for removing operation, which is continuous between the locking portions 114, 114, is integrally provided in a V-shape (a U-shape), and a retention target portion 116 extending in a linear shape on extension of the first arm 112 is integrally provided (FIG. 3(a)). The wire 48 changes an angle with respect to the first arm 112 and the second arm 113 from a natural state (a no-load state) to thereby produce a biasing load so as to restore the angle with respect to the first arm 112 and the second arm 113 to the natural state by way of the wire main body 111. In the embodiment, in so far as the wires 48 are concerned, there are set: wire wires 48a, 48b which are first wires (one and another wires) mounted to the side opening portions 47a, 47b; and a lower wire 48c which is a second wire mounted to the lower opening portion 47c which is a position different from those of the side wires 48a, 48b.

Also, a respective one of the wires 48 is pulled in a direction which is opposite to that of the hooks 37 by inserting a tool provided with an L-shaped hook, for example, although not shown, into the removing operation portion 115, thereby making it possible to disengage the locking portions 114, 114 and the locking recessed portions 55, 55 of the hooks 37 from each other.

The wire retaining portion 106 has: a first retaining portion 117 formed in the shape of circular hole, adapted to retain the wire main body 111; an arm retaining portion 118 which is continuous to the first retaining portion 117, adapted to retain the second arm 113; and a second retaining portion 119 adapted to the retention target portion 116. Also, by way of the wire retaining portion 106, the side wires 48a, 48b are retained so as to bias the module 11 toward the gravity (the center) of the virtual triangle T, that is, in a transverse direction and in a lower direction; the lower wire 48c is retained so as to bias the module 11 toward the gravity (the center) of the virtual triangle T, that is, in an upper direction (a direction which is orthogonal to that of the steering shaft).

The first retaining portion 117 is provided so as to pass through the fixing portion 104, and the wire main body 111 of the wire 48 is engaged so as to retain the outer circumference of the wire main body 111.

The arm retaining portion 118 is formed in a predetermined direction along the tangential direction of the first retaining portion 117, and restrains a turning position of the second arm 113 of the wire 48 against biasing.

The second retaining portion 119 is formed in a curved shape along an arc around the first retaining portion 117 at a position which is opposite to those of the first retaining portion 117 and the arm retaining portion 118 with respect to the opening portion 47, and restrains a turning position of the first arm 112 by retaining the retention target portion 116 of the wire 48 at an end part thereof against biasing. Therefore, according to a positional relationship between the end part of the second retaining portion 119 and the arm retaining portion 118, a relative angle between the first arm 112 and the second arm 113 of the wire 48 is set, and in the embodiment, the size of the biasing loads by the wire 48 is set in correspondence with (in proportion to) the size of a collimation angle from the natural state of the second arm 113.

Here, a sum of the biasing loads with respect to the hooks 37 by these wires 48 is obtained as being substantially 0. In the case of the embodiment, the lower wire 48c does not impart the biasing load in the transverse direction with respect to the module 11 and thus the biasing loads that are applied in the transverse direction by the side wires 48a, 48b are set. In so far as the side wires 48a, 48b are concerned, a collimation angle $\theta 2$ of a respective one of the second arms 113 are set so as to be equal to each other, and these wires are disposed so as to be transversely symmetrical to each other, that is, at positions which are symmetrical to each other with respect to the biasing load directions by the lower wire 48c to thereby produce biasing loads toward directions which are opposite to each other, whereby the biasing loads in the transverse direction are cancelled each other. Therefore, a collimation angle $\theta 3$ of the second arm 113 of the lower wire 48c is set so as to cancel the weight of the module 11 and the biasing loads that are applied to a lower side by way of the side wires 48a, 48b. That is, on the assumption that a mass of the module 11 is m and the gravitational acceleration is g, the mass M1 of the module 11 to be supported by the lower wire 48c is obtained as being M1=m×g×cos $\theta 1$. It is to be noted that a mass M2 of the module 11, which is applied along the steering shaft, is cancelled by a biasing load of a horn spring 51. Also, a biasing load F from the side wires 48a, 48b to be supported by the lower wire 48c is obtained as being F=2×(T1/D)×sin θ4, on the assumption that: an output torque exerted by a respective one of the side wires 48a, 48b is defined as T1; a distance from a center of the wire main body 111 of a respective one of the side wires 48a, 48b to the point of action (middle parts of the locking portions 114, 114) is defined as D; and an angle at which the biasing load from a respective one of the side wires 48a, 49b with respect to the hook 37 acts on a lower side (a direction which is orthogonal to that of the steering shaft) (an angle in the vertical direction of the first arm 112 when seen in the front face direction) is defined as θ4. Therefore, an output torque T2 required for the lower wire 48c in order to cancel a sum of the weight M1 and the biasing load F (M1+F) is obtained as being T2=(M1+F)×D and thus the collimation angle θ3 of the second arm 113 of the lower wire 48c is set at θ3=T2/k={(M1+F)×D}/k, on the assumption that a spring constant of the lower wire 48c is k.

Specifically, in the embodiment, the collimation angle θ2 of a respective one of the second arms 113 of the side wires 48a, 48b that are retained by the wire retaining portion 106 are respectively set to 20 degrees (the angle between the first arm 112 and the second arm 113 is set to 90 degrees), and the collimation angle θ3 of the second arm 113 of the lower wire 48c that is retained by the wire retaining portion 106 is set to 36 degrees, which is larger than the collimation angle θ2.

The fixed contact points 63 are formed of a member such as a metal having its electrical conductivity, and are respectively disposed at both side parts and a lower part of the boss cored bar 96, the contact points protruding to the front side.

A respective one of the spoke cored bars 97 is adapted to radially couple the boss cored bar 96 and the rim cored bar 95 to each other, and is bent in a longitudinal wall shape so as to gradually protrude toward the front face direction from one end part which is continuous to a respective one of the coupling cored bars 103 of the boss cored bar 96 to another end part which is continuous to the rim cored bar 95.

Also, in so far as the steering wheel main body 12 is concerned, the cover body 13 is mounted to the steering wheel main body 12 while the cover body is combined and positioned from a rear side. After that, the boss 101 of the steering wheel main body 12 is engagingly fitted to the steering shaft and then is tightened and fixed with appropriate nuts, although not shown.

To the steering wheel main body 12, the module 11 is mounted with so called one touch of a finger by pushing it from the front side. That is, when the module 11 is pushed against the steering wheel main body 12 from the front side, the wire retaining portions 106 of the wires 48 that are positioned in the respective opening portions 47 engage with the locking recessed portions 55, 55 of the hooks 37, and the module 11 engages with the steering wheel main body 12 and then are snap-fitted and supported at three portions, at both sides and the lower side.

Figure 1:
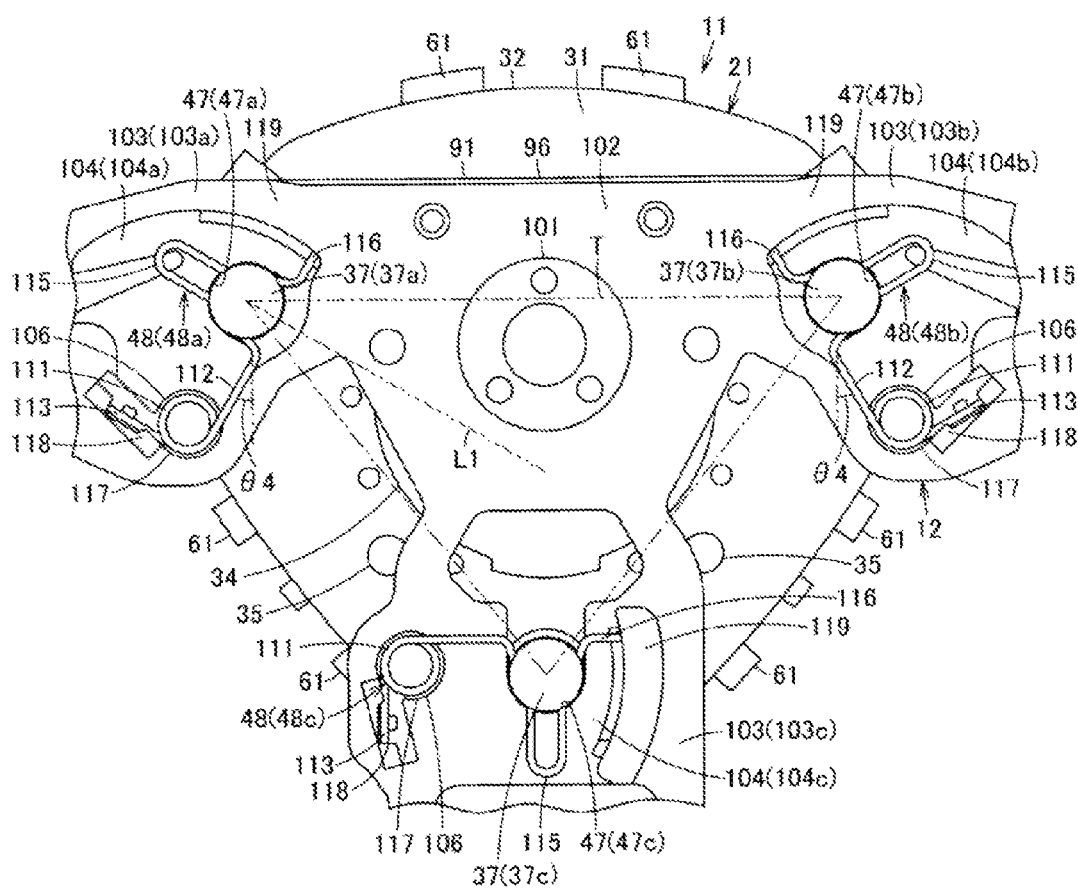
FIG. 1(a) is a plan view showing a state in which a module of a steering wheel according to the present invention is mounted to a steering wheel main body from a rear side (a first embodiment)
FIG. 1(b) is a sectional view showing a state of insertion of one hook into an opening portion.
FIG. 1(c) is a sectional view showing a state of insertion of another hook of one side into an opening portion.
FIG. 1(d) is a sectional view showing a state of insertion of still another hook of another side into an opening portion.
Figure 1:
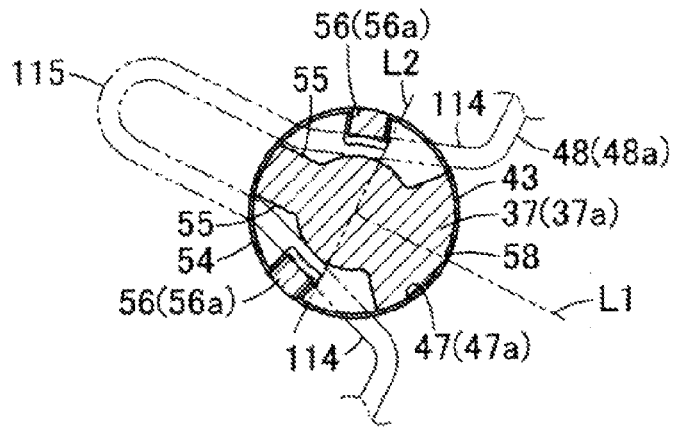
Figure 1:
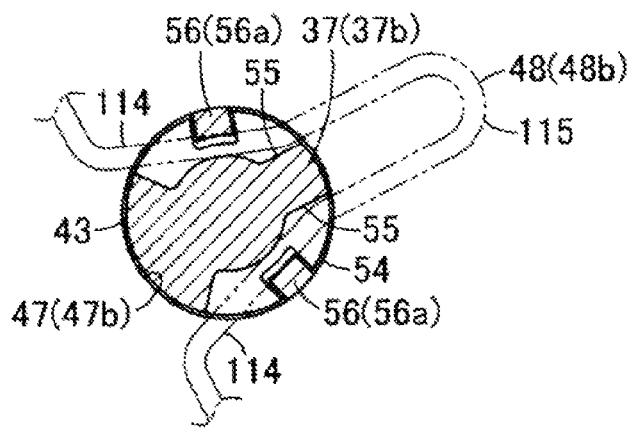
Figure 1:
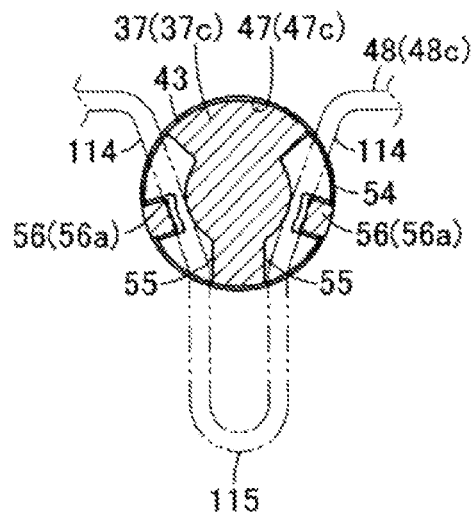

In more detail, in the module 11, the hooks 37, a respective one of which protrudes to the most front part, that is, to a position which is opposite to that of the boss cored bar 96, is pushed so as to be positioned in a respective one of the opening portions 47 that are opened in the base plate 21, the insertion portion 44 of a respective one of the hooks 37 serves as a guide and then the hook main body portion 43 is inserted into the opening portion 47. At this time, in one side hook 37a, the adjustment rib 58 comes into contact with the inside face of a side opening portion 47a, whereby the module 11 is positioned in the vertical and transverse directions with respect to the steering wheel main body 12, and in correspondence with this positioning, the claw portions 56a, 56a of the adjustment pins 56, 56 that come into contact with the inside face of the side opening portion 47a are elastically deformed to thereby adjust a dimensional difference. Similarly, at the other side hook 37b and the lower hook 37c, in correspondence with the positioning in the vertical and transverse directions by the side hook 37a and the adjustment rib 58, the claw portions 56a, 56b of the respective adjustment pins 56, 56 that come into contact with the inside faces of the other side opening portion 47b and the lower opening portion 47c are elastically deformed to thereby adjust a dimensional difference. That is, one side hook 37a acts as a positioning reference by the adjustment rib 58, and the other side hook 37a and the lower hook 37c prevent rotation of the module 11, whereby the module 11 is positioned with respect to the steering wheel main body 12. Further, the insertion portion 44 moves the locking portions 114, 114 of the wires 48 that are positioned at a rear side of the openings 47 so as to be pressed in a direction which crosses (is orthogonal to) a direction in which the hooks 37 are pushed into the module 11 against the biasing load thereof. Then the module 11 is sufficiently pushed, and when the insertion portion 44 passes through the locking portions 114, 114, the wires 48 are restored and deformed and then the locking portions 114, 114 are engaged with the locking recessed portions 55, 55 of the hooks 37 (FIG. 1(*b*) to FIG. 1(*d*)). As a result, the module 11 is positionally restrained in a respective one of the forward and backward direction, the vertical direction, and the transverse direction so as to be relative to the steering wheel main body 12, and the respective hooks 37 are reliably snap-fitted in the front face direction by the wires 48, and the module 11 is prevented from unintentionally coming out from the steering wheel main body 12.

Also, in this state, the steering wheel main body 12 is guided along the front face to rear face direction by way of a respective one of the hooks 37.

In addition, for example, electrical wiring is provided for a contact point portion of the inflator 25, whereby the steering wheel 10 that is provided with the module 11 is constructed while the steering wheel is mounted to the steering shaft.

In the thus constructed steering wheel 10, an occupant at the driver's seat grips and turns the rim portion 87, whereby operation at the time of cruising is carried out. Also, the occupant pushes and operates the airbag cover 22 of the module 11 that is compatible with a pushing operation portion against the biasing load of a respective one of the horn springs 51, whereby the module 11 is relatively guided to a front side by way of a respective one of the hooks 37, and if any movable contact point 38 comes into contact with a fixed contact point 63, a horn device on the vehicle body side is blown. At this time, in a case where the occupant pushes and operates a position biased from a center, such as the top and bottom or the left and right of the airbag cover 22, although the airbag cover 22 moves to the front side in a state in which the cover is slightly inclined, the adjustment rib 58 is set onto to one hook (one side hook 37a) in three hooks 37 (the side hooks 37a, 37b and the lower hook 37c) of the module 11; and therefore, such an inclination is not prevented by the adjustment rib 58.

Also, when the module 11 is removed from the steering wheel main body 12, a tool provided with a L-shaped hook, for example, although not shown, is inserted into the removing operation portion 115 to thereby pull the module in the direction that is opposite to that of the hooks 37 and then remove the module from the locking recessed portions 55, 55. In this manner, engagement of the hooks 37 by way of the wires 48 s released and then the module 11 can be removed.

On the other hand, in the event of a front face collision of a motor vehicle, a gas is rapidly injected from the inflator 25 into the airbag 23 and then the folded housed airbag 23 rapidly inflates. Then, by way of the inflation pressure of the airbag 23, the airbag cover 22 cleaves along the tear line and then the protrusion opening of the airbag 23 is formed, and the airbag 23 protrudes from this protrusion opening and then inflates and expands in front of the occupant to thereby constrain and protect the occupant.

Thus, according to the embodiment, among a plurality of columnar hooks 37 which are inserted into the opening portions 47 and which is retained to be engaged with the wires 48, the adjustment rib 58 that is protrusively provided on the outer circumferential face 54 of one side hook 37a comes into contact with the inside face of one side opening portion 47a. In this manner, the position of one side hook 37a in such one side opening portion 47a is restrained, and a plurality of adjustment pins 56 which are protrusively provided at positions, a respective one of which is different from that of the adjustment rib 58 of the outer circumferential face 54 of such one side hook 37a, come into contact with the inside face of one side opening portion 47a to thereby elastically come into contact with the inside face of one side opening potion 47a. Then, the respective functions of supporting and positioning the module 11 with respect to the steering wheel main body 12 can be integrated with each other with respect to the respective hooks 37, the respective opening portions 47, and the respective wires 48, and in other words, by the respective hooks 37, the respective opening portions 47, and the respective wires 48 that are employed to support the module 11 with respect to the steering wheel main body 12, the module 11 can be shared for the purpose of positioning with respect to the steering wheel main body 12, there is no need to allocate a space in which an additional positioning pin or the like is to be provided, and it becomes possible to reliably position the module 11 with respect to the steering wheel main body 12 while coping with downsizing of the module 11.

In addition, the biasing loads in the transverse direction of the side wires 48a, 48b are equal to each other, and a biasing load which is applied to a lower side of the side wires 48a, 48b, that is, in a direction facing the lower wire 48b is equal to a biasing load which is applied to an upper side by way of the lower wire 48c, whereby, at a position at which all the hooks 37 are centered, a sum of the biasing loads of the plurality of wires 48 with respect to the plurality of hooks 37 is obtained as being substantially 0. In this manner, by way of adjustment of the biasing loads of these wires 48, it becomes possible to reliably position the module 11 and the steering wheel main body 12 while coping with downsizing of the module 11, and the weight and manufacturing costs of the module 11 are not adversely affected. Moreover, a biasing load of the wires 48 can be easily changed by changing a collimation angle of the second arm 113.

Further, except one side hook 37a, a plurality of adjustment pins 56 are protrusively provided on the outer circumferential faces 54 of the other side hook 37b and the lower hook 37c, and these adjustment pins 56 come into contact with the inside face of one side opening portion 47a of the adjustment rib 58 of one side hook 37a to thereby elastically come into contact with the inside faces of the other side opening portion 47b and the lower opening portion 47c. In this manner, it becomes possible to reliably whirl-stop the module 11 with respect to the steering wheel main body 12, and it becomes possible to more reliably position the module 11 and the steering wheel main body 12 while coping with downsizing of the module 11.

As a result, the layout property becomes advantageous, and downsizing of the module 11 or a structural use for a variety of vehicle types becomes possible.

In addition, the adjustment ribs 58 and the adjustment pins 56 of the hooks 37 are taken along the axial direction of the hooks 37 which is a die removing direction at the time of molding of the base plate 21; and therefore, a molding die of the base plate 21 can be easily molded without any complication.

(Second and Third Embodiments)

Figure 8:
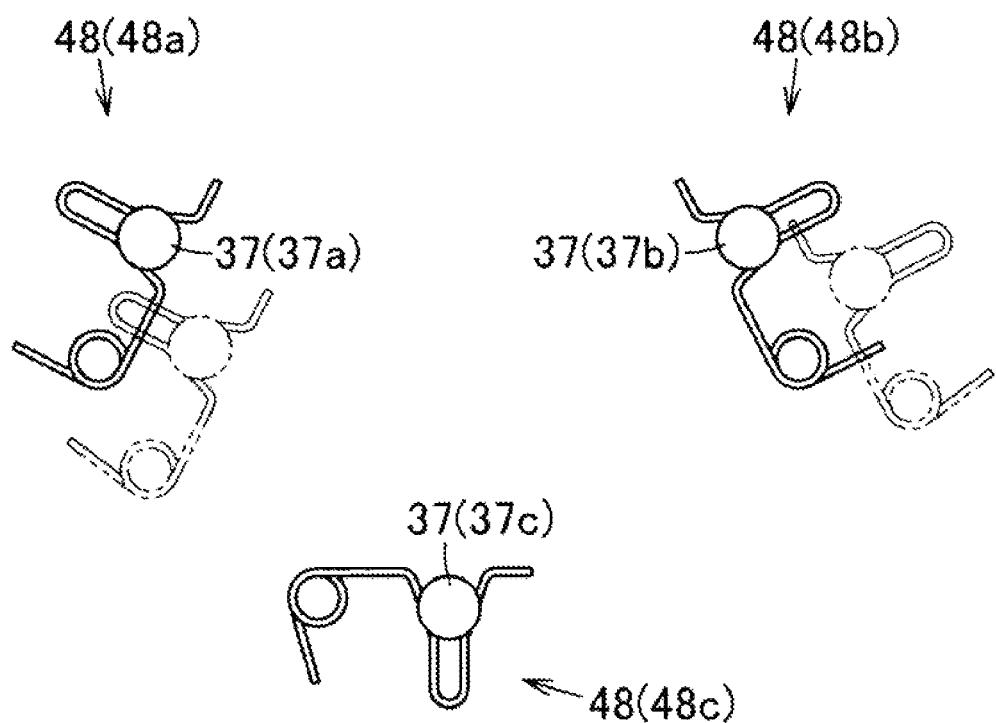
FIG. 8 is an explanatory view schematically depicting a wiring layout in the steering wheel according to the present invention (a second embodiment)
Figure 9:
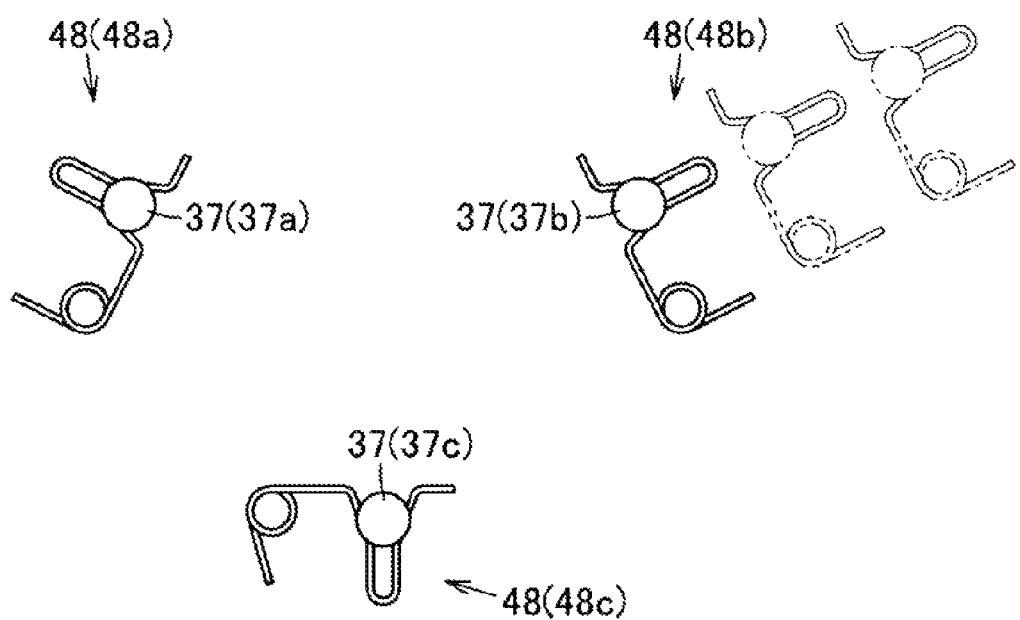
FIG. 9 is an explanatory view schematically depicting a wiring layout in the steering wheel according to the present invention (a third embodiment)

It is to be noted that, in the first embodiment described above, as long as the sum of the biasing loads with respect to the hooks 37 by the wires 48 can be obtained as being substantially 0, that is, the biasing loads by all of the wires 48 can be well balanced, the layout of the wires 48, that is, the positions or shapes of the wire retaining portions 106 and the fixing portions 104 can be arbitrarily set. For example, as is the case with a second embodiment shown in FIG. 8, by appropriately changing the biasing load of a respective one of the side wires 48a, 48b (the collimation angle of the second arm 113), the positions of the side wires 48a, 48b may be respectively asymmetrically disposed while the respective positions are changed in the vertical direction and the transverse direction. Also, as is the case with a third embodiment shown in FIG. 9, in a case where a position of at least any wire 48, for example, the position of the side wire 48b is changed along its biasing load direction (coaxially along the resultant force), an asymmetrical layout can be provided without a need to change the biasing load. According to the second and third embodiments, it becomes possible to cope with an asymmetrical layout of the wires 8 and thus the degree of freedom in design of the steering wheel 10 (the module 11 and the steering wheel main body 12) is improved.

In addition, in a respective one of the embodiments described above, the hooks 37 in which an adjustment rib is provided may be the other side hook 37b or may be a lower hook 37c.

Further, the steering wheel 10 can be applied to a construction or the like provided with two or four spoke portions 89, for example, without being limited to the construction that is provided with three spoke portions 89.

Furthermore, the wires 48 can be formed in any other arbitrary shape such as a U-shape, for example.

Still furthermore, although there has been employed a construction in which the hooks 37 are protrusively provided in the module 11 (the base plate 21) and the opening portions 4 and the wires 48 are disposed in the steering wheel main body 12 (the boss cored bar 96), there can be employed a construction in which the opening portions 47 and the wires 48 are disposed in the module 11, and the hooks 37 are protrusively provided in the steering wheel main body 12 (the boss cored bar 96).

Yet furthermore, as the module 11, there can be employed a pad body adapted to house a shock absorbing body, for example, in place of the airbag device.

[Industrial Applicability]

The present invention can be preferably employed as a steering wheel of a motor vehicle, for example.

(Fourth Embodiment)

Figure 10:
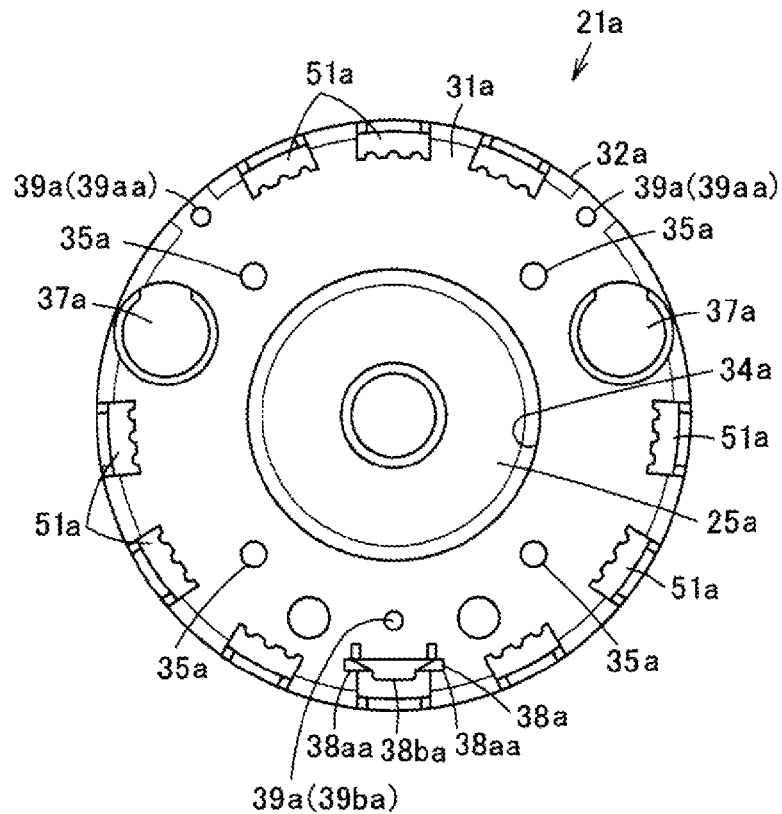
FIG. 10(a) is a plan view showing a part of the module of the steering wheel according to the present invention (a fourth embodiment)
FIG. 10(b) is a plan view showing a part of the steering wheel main body.
Figure 10:
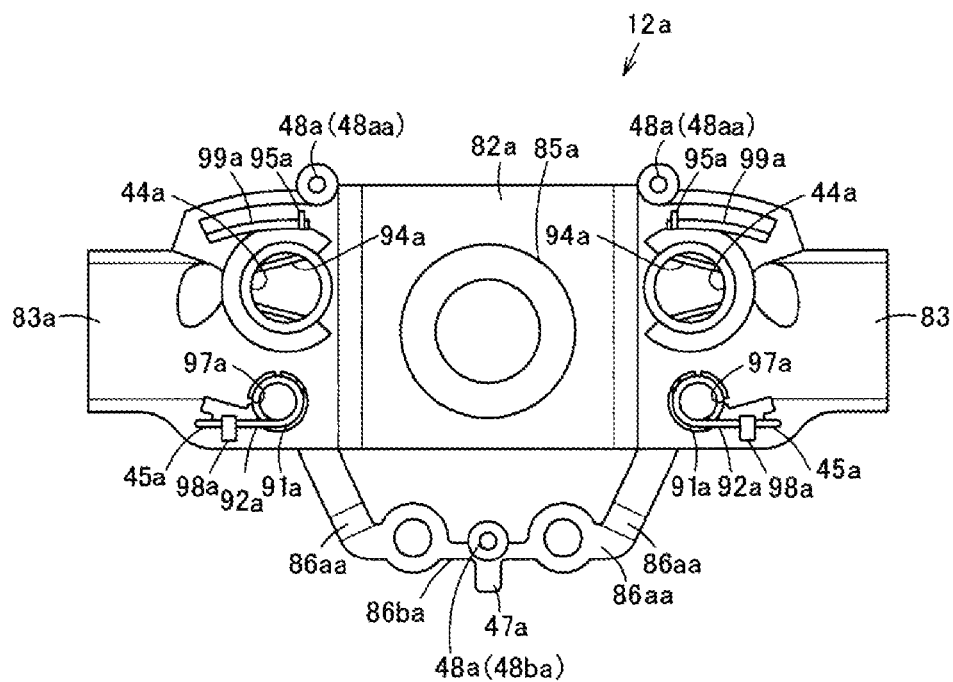
Figure 11:
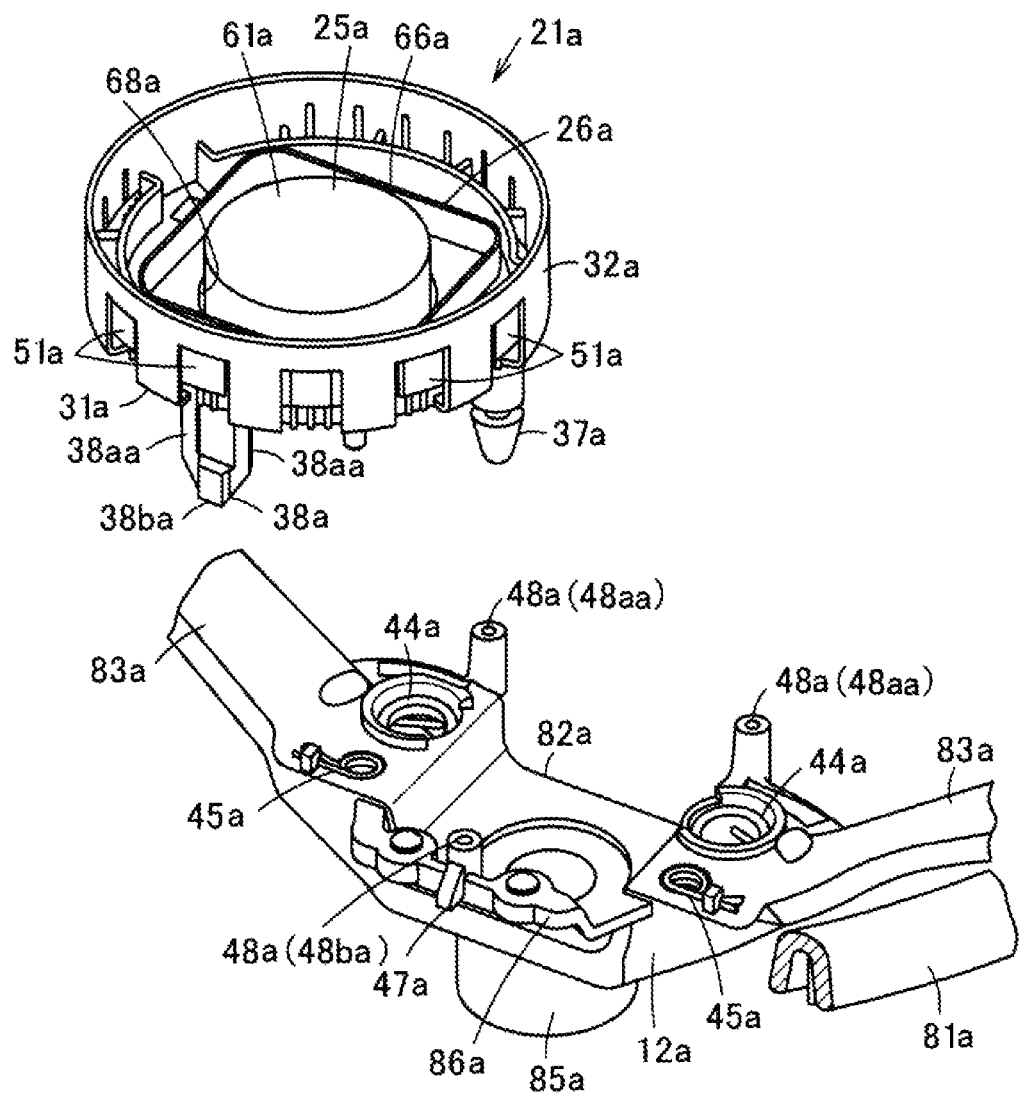
FIG. 11 is an exploded perspective view of the steering wheel main body and the module of the same steering wheel as above.
Figure 12:
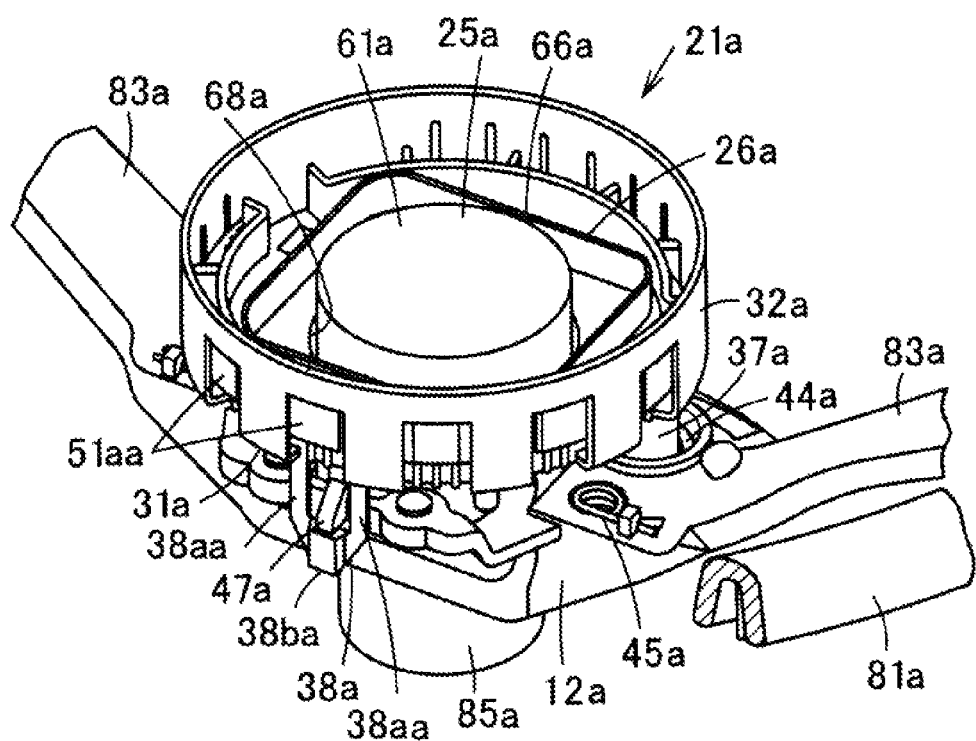
FIG. 12 is a perspective view showing a state in which a part of the module of the same steering wheel as above is mounted to the steering wheel main body.
Figure 13:
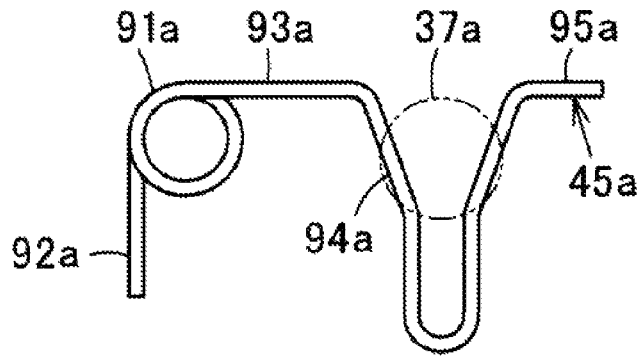
FIG. 13(a) is a plan view showing a state of engagement between a hole portion and a hook.
FIG. 13(b) is a sectional view of FIG. 13(a)
FIG. 13(c) is a side view showing a state of engagingly locking between a locking portion and a locking receiving portion.
Figure 13:
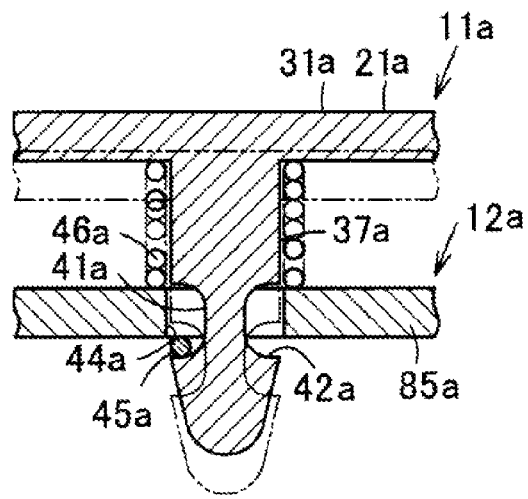
Figure 13:
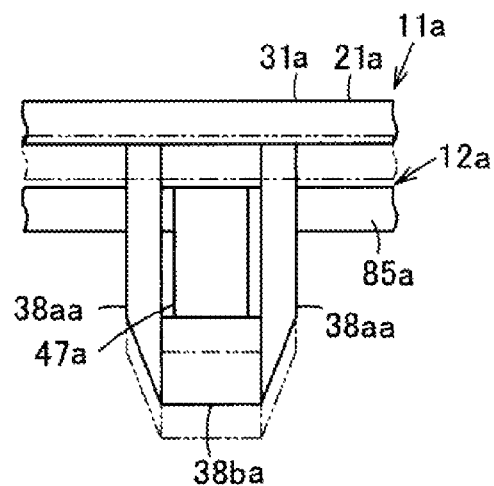

Hereinafter, a steering wheel according to a fourth embodiment of the present invention will be described with reference to the accompanying drawings. According to the present invention, there is provided a steering wheel which can be inexpensively manufactured and which can be downsized, the steering wheel being capable of easily mounting a module, the steering wheel having an appropriate operability in operation of bringing a contact point of a horn device into contact with something. As shown in FIG. 10, according to the present invention, opening portions 44*a*, 44*a* are provided so as to be spaced from each other with respect to the steering wheel main body 12*a*. In a module, hooks 37*a*, 37*a* which can be respectively inserted into the opening portions 44*a*, 44*a* are provided so as to be spaced from each other. Wires 45*a*, 45*a* are provided in such a manner as to retain the hooks 37*a*, 37*a* that are inserted into the respective opening portions 44*a*, 44*a*. In the module, an locking portion 38*a* is provided between any of the opening portions 44*a*, 44*a* and the hooks 37*a*, 37*a*. In the steering wheel main body 12, locking receiving portions 47*a* are provided in such a manner as to engagingly lock the locking portions 38*a* in a direction of insertion of the hooks 37*a*, 37*a* into the opening portions 44*a*, 44*a*. At least at positions of the locking portions 38*a*, movable contact points 39*a* of a horn device are provided in the module. In the steering wheel main body 12, fixed contact points 48*a* of the horn device are provided so as to be opposed to the movable contact points 39*a*.

The present invention relates to a steering wheel provided with a plurality of engagement members which are respectively engaged with hooks which are inserted into a plurality of hole portions so as to retain the hooks to thereby support a module with respect to a steering wheel main body.

Conventionally, as a steering wheel, that is, a steering wheel of a motor vehicle, there has been a steering wheel configured to mount a module such as an airbag device provided with: an airbag folded at a boss portion (a boss cored metal) which is a supporting portion constituting a steering wheel main body; an inflator adapted to supply a gas to this airbag; a base plate to which these airbags and inflator are mounted; and a cover body which is coupled with a base plate and which is adapted to cover the airbag and the inflator.

Also, as such an airbag device, there has been known a construction in which, with respect to snap lock springs (wires) which are U-shaped engagement members respectively disposed at three parts, both side parts and a lower part of through holes provided in the base plate of a case body of the module, a plurality of hooks which are engagement portions provided at the boss portion of the steering wheel main body are respectively pushed into the through holes and then are hooked on the snap lock springs to thereby mount the module to the boss portion with just one touch of a finger. In addition, to a respective one of the hooks, a coil spring is mounted, and an airbag device is biased in the front face to the rear face direction with respect to a boss portion (a boss cored bar). In addition, in opposite to a fixed contact point which is provided in the boss portion (the boss cored bar), a movable contact point is provided in the airbag device and then the airbag device is pushed against biasing of the coil spring, whereby the contact points come into contact with each other, and a horn device is blown (for example, reference should be made to Japanese Patent No. 4797584 and Japanese Patent No. 5240126).

However, in the case of the construction described above, through holes, hooks, and snap lock springs are respectively mounted to three portions, both side parts and a lower part; and therefore, the number of parts increases, inexpensive manufacturing is not easy, and it takes long to assemble the airbag device. In addition, in the case where these through holes, hooks, and snap lock springs are respectively disposed at every two portions or the like, operability for operating the horn device is not appropriate.

The present invention has been made in view of such a circumstance, and it is an object of the present invention to provide a steering wheel which can be inexpensively manufactured, which can be downsized, which is capable of easily mounting a module, and which has an appropriate operability in operation of bringing a contact point of a horn device into contact with something.

A steering wheel according to a fifth aspect of the present invention is provided, and comprises: a steering wheel main body; a module; a pair of hole portions which are provided so as to be spaced from each other in either one of the steering wheel main body and the module; a pair of hooks which are provided so as to be spaced from each other in another of the steering wheel main body and the module and which can be respectively inserted into the hole portions; a pair of engagement portions which are disposed in the respective hole portions, which are biased in a predetermined direction crossing a insertion direction of the hooks into the hole portions, and which are engaged with the hooks that are inserted into the hole portions so as to retain the hooks to thereby support the module with respect to the steering wheel main body; a locking portion which is provided between either of the pair of the hole portions and the pair of the hooks in either one of the steering wheel main body and the module; a locking receiving portion which is provided in another of the steering wheel main body and the module and which is adapted to engagingly lock the locking portion in the insertion direction of the hooks into the hole portions; and a horn device which comprises: one contact point which is provided at least either one of the steering wheel main body and the module at a position of the locking portion; and another contact point which is provided so as to be opposed to the one contact point in another of the steering wheel main body and the module, the horn device being blown by way of contact of the one and another contact points due to a relative movement of the module with respect to the steering wheel main body along the insertion direction of the hooks into the hole portion.

A steering wheel according to a sixth aspect of the present invention is provided in such a manner that the pair of hole portions are positioned at both of the left and right side parts in either one of the steering wheel main body and the module, the pair of hooks are provided at a position which corresponds to the pair of hole portions in another of the steering wheel main body main body and the module, the locking portion is positioned at a central lower part in a transverse direction of either one of the steering wheel main body and the module, and the locking receiving portion is provided at a position which corresponds to the locking portion in another of the steering wheel main body and the module.

With the steering wheel according to the fifth aspect of the present invention, the hole portions and the hooks are paired, and the module is further engagingly locked with the steering wheel main body by way of the locking portion and the locking receiving portion that are respectively positioned between the pair of hole portions and the hooks; and therefore, the number of parts of the engagement members that are disposed in the hole portions can be reduced, inexpensive manufacturing can be carried out, and downsizing becomes possible in comparison with the case of setting three or more hole portions and hooks, for example, while reliably engagingly locking the module with respect to the steering wheel main body. In addition, the module can be mounted by merely engagingly locking the locking portion with the locking receiving portion and then inserting the hooks into the hole portions; and therefore, the module can be easily mounted. Further, one contact point and another contact point are provided in correspondence with a positional relationship between the locking portion and the locking receiving portions; and therefore, the operability in operation of bringing a contact point of the horn device into contact with something is improved.

With the steering wheel according to the sixth aspect of the present invention, the pair of hole portions and the pair of hooks are disposed both of the left and right side parts, and the locking portion and then locking receiving portion are disposed at the central lower part in the transverse direction. In this manner, the module can be engagingly locked with the steering wheel main body in a well-balanced manner and reliably, and the operability in operation of bringing the contact point of the horn device into something can be improved more remarkably.

Figure 14:
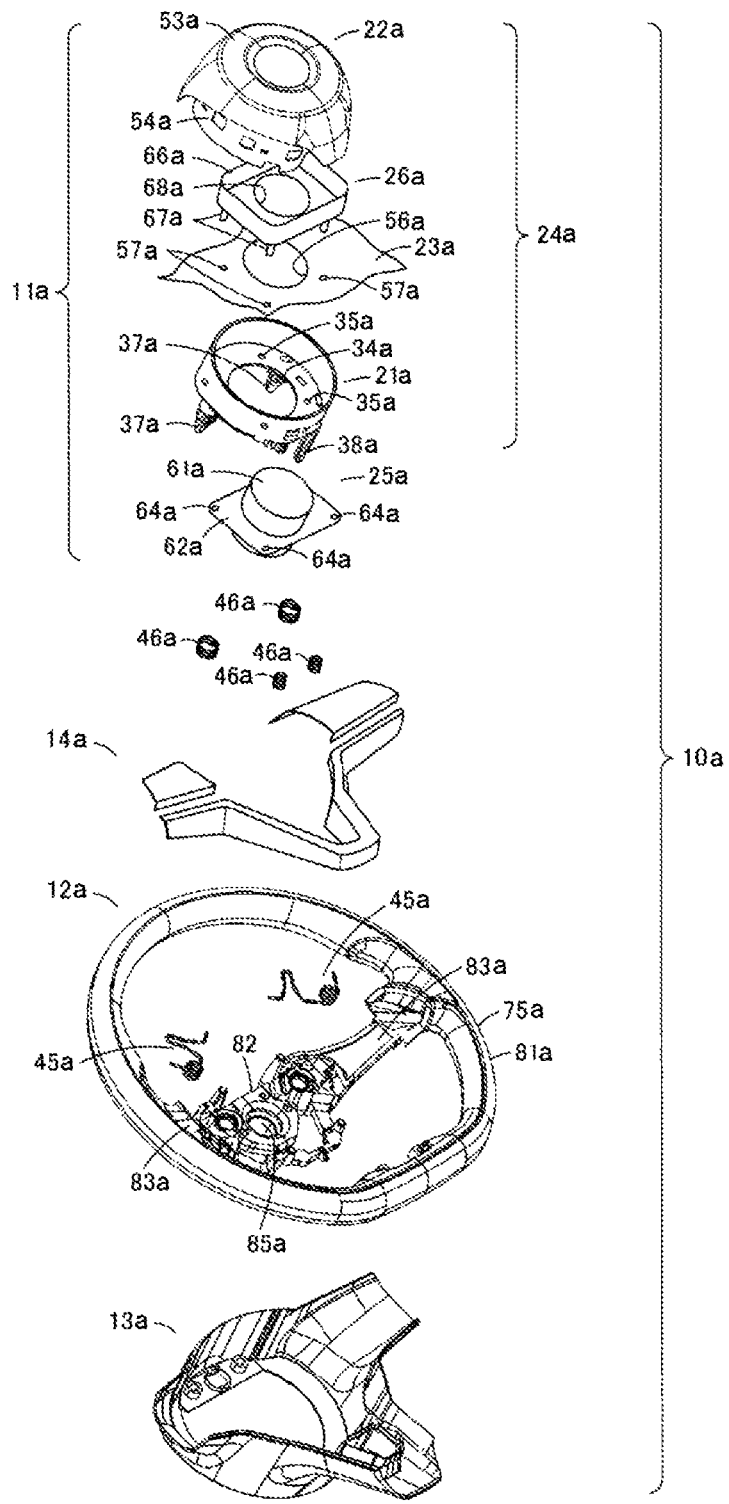
FIG. 14 is an exploded perspective view of the same steering wheel as above.
Figure 15:
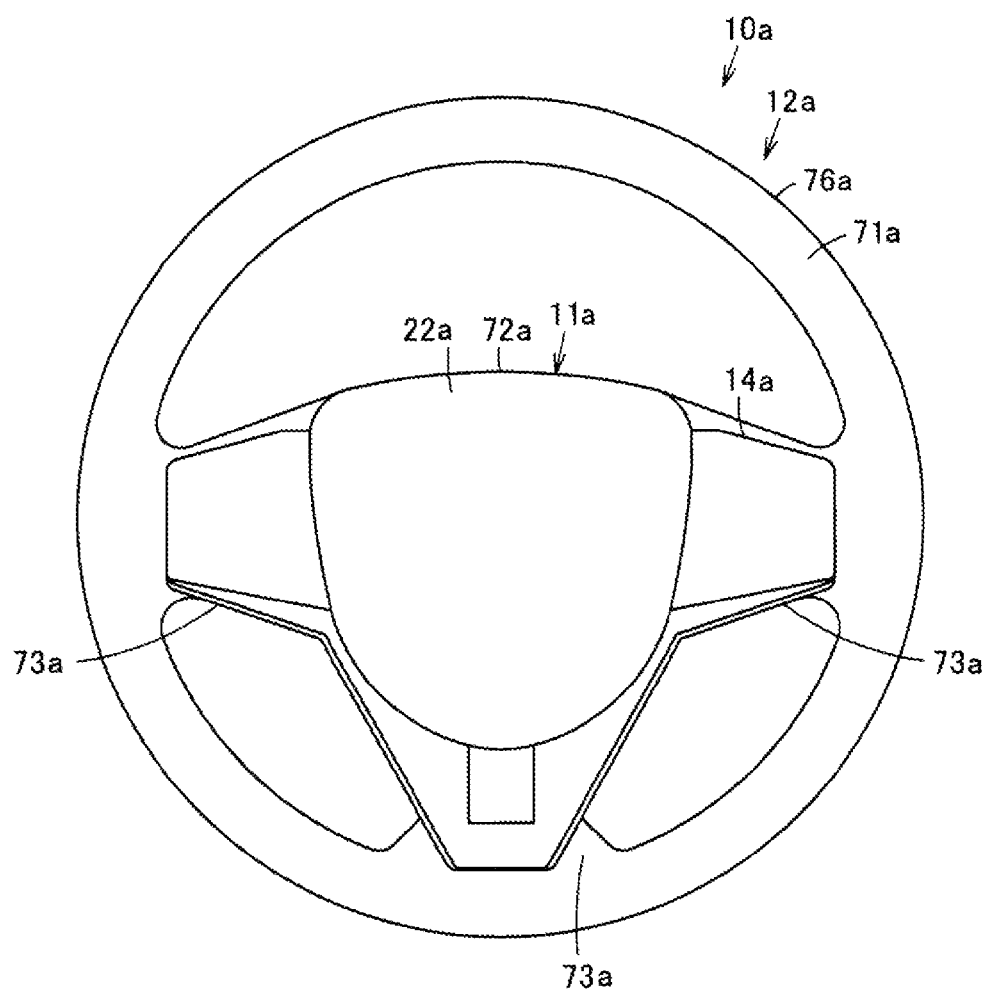
FIG. 15 is a plan view showing the same steering wheel as above.

In FIG. 14 and FIG. 15, reference numeral 10a designates a steering wheel, and the steering wheel 10a is composed of: a module 11a which is disposed in front of an occupant at a driver's seat of a motor vehicle; a steering wheel main body 12a serving as a steering wheel main body in which the module 11a is attached to the occupant's side; a cover body (a body cover) 13a serving a steering covering member which is mounted on a counter-occupant side of the steering wheel main body 12a; and a finisher (a garnish) 14a serving as a decoration member which is mounted on the occupant's side of the steering wheel main body 12a.

It is to be noted that the steering wheel 10a is generally mounted to a steering shaft serving as a steering device, although not shown, which is provided in a state in which the device is inclined in a inclined state with respect to a horizontal direction (a perpendicular direction); and however, hereinafter, a description will be given on the assumption that: the side of the module 11a is defined as the occupant's side, a front side, or a rear side; the steering wheel side is defined as a vehicle body side, a rear side, or a front side; a forward and backward direction taken along the steering shaft is defined as an axial side; and directions such as the forward and backward direction and a vertical direction are defined with reference to a forward direction of a vehicle body provided with the steering wheel 10a.

In the embodiment, the module 11a is obtained as an airbag device (an airbag module) provided with: a case 24a provided with a base plate 21a which is a mounting member serving as a housing body and an airbag cover 22a serving as a covering body, the case being adapted to house a folded airbag 23a; an inflator 25a which is disposed in the case 24a; and a retainer 26a or the like.

The base plate 21a shown in FIG. 10(a) and FIG. 11 to FIG. 14 is also referred to as a back plate or a back holder or the like; the base plate is compatible with a horn plate of a horn mechanism, although not shown; and the base plate is integrally injection-molded with a synthetic resin, for example. In addition, the base plate 21a is provided with: a board portion 31a which is a mounting surface portion serving as a case main body; and a peripheral wall portion 32a which is erected on a front side all over the peripheral edge part on a surface side of the board portion 31a.

In the board portion 31a, inflator mounting holes 34a each formed in the shape of a circular hole are opened in a substantially center part, and four mounting holes 35a are respectively opened so as to surround the inflator mounting holes 34a. Also, in the board portion 31a, a pair of columnar (cylindrical) hooks 37a adapted to retractably mount the module 11a to a steering wheel main body 12a are protrusively provided on a rear side. In addition, in the board portion 31a, the locking portion 38a adapted to retractably mount the module 11a to the steering wheel main body 12a is protrusively provided on a rear side. Further, to the board portion 31a, an electrically conductive plate which is electrically conductive, although not shown, which is adapted to set the movable contact point 39a which is one contact point to a proximal end part of the locking portion 38a, for example, is integrally molded, is embedded, and is mounted.

The hooks 37a are adapted to removably engagingly lock the module 11a and the steering wheel main body 12a and to guide the module 11a along the front face to rear face direction with respect to the steering wheel main body 12a. In these hooks 37a, at tip end sides, recessed portions 41 which are narrowed hook portions are provided, and faces at tip end sides of the recessed portions 41a are obtained as engagingly locking faces 42a (FIG. 13b)). Also, tip end parts of the hooks 37a each are formed in a conical shape so as to gradually narrow (to be reduced in diameter) to a respective one of the tip end sides. Also, in these hooks 37a, tip end sides are inserted into opening portions 44a serving as hole portions of the steering wheel main body 12a which will be described later, the tip end sides are elastically engagingly locked and retained at positions of engagingly locking faces 42a (recessed portions 41a) by way of wires 45a serving as engagement members which are respectively mounted to these opening portions 44a, and the tip end sides are movable along the front face to rear face direction with respect to the opening portions 44a (FIG. 13(b)). In the embodiment, the hooks 37a are positioned so as to be spaced from each other at both of the left and right side parts at an upper part of base plate 21a (a board portion 31a) of the module 11a, that is, in a 9 o'clock direction and a 3 o'clock direction in the steering wheel 10a in its neutral state. In addition, at the periphery of the proximal end side of a respective one of the hooks 37a, one end part (a rear end part) of a horn spring 46a which is a coil spring serving as biasing means for biasing the module 11a toward a rear side (the occupant's side) with respect to the steering wheel 12a is retained.

The locking portions 38a are engagingly locked with the locking receiving portions 47a that are provided on the side of the steering wheel 12a which will be described later; the locking portions engagingly lock in the front face to rear face direction that is the direction of insertion the hooks 37a into the opening portions 44a engagingly lock, specifically snap-fit in the front face direction; the locking portions restrain a backlash with respect to the steering wheel main body 12a of the module 11a, and operate the module 11a so as to improve operability when operating a horn device. The locking portions 38a each are provided with: a pair of protrusion portions 38aa, 38aa serving as restraining portions which protrude along a direction parallel to (substantially parallel to) the hooks 37a and which restrain the position in the transverse direction of the locking receiving portions 47a; and engagingly locking target portions 38ba which are directly engagingly locked with the locking receiving portions 47a while coupling the tip end parts of these protrusion portions 38aa, 38aa to each other; and are formed in the shape of a loop (a U-shape) with respect to the board portion 31a. Also, the locking portions 38a each are positioned at the central lower part in the transverse direction of the base plate 21a (the board portion 31a) of the module 11*a*, that is, in the 6 o'clock direction in the steering wheel 10 in its neutral state. Therefore, the locking portions 38*a* each are positioned in the transverse direction between the hooks 37*a*, 37*a*, and are disposed at apex positions of a virtual isosceles triangle when seen from a front side together with these hooks 37*a*, 37*a*. In other words, these hooks 37*a* and locking portions 38*a* are disposed so as to be substantially transversely symmetrical to each other as a while.

The movable contact points 39*a* are opposed to the fixed contact points 48*a* which are another contact points of a horn device which is disposed on the side of the steering wheel main body 12*a* which will be described later, and constitute horn switches which are switches of the horn device together with these fixed contact points 48*a*. At these movable contact points 39*a*, there are set: a pair of upper movable contact points 39*aa*, 39*aa* which are a one of movable contact points disposed at both of the upper left and right side parts; and a lower movable contact point 39*ba* which is another movable contact point disposed at a central lower part in the transverse direction. That is, the movable contact points 39*a* are respectively at both of the side parts and the lower part of the board portion 31*a* of the base plate 21*a*, and are disposed at the apex positions of the virtual isosceles triangle when seen from the front side.

The upper movable contact points 39*aa*, 39*aa*, at upper positions than those of the hooks 37*a*, 37*a*, are disposed at positions, a respective one of which is more proximal to the center in the transverse direction than the center axes of these hooks 37*a*, 37*a*. Also, these upper movable contact points 39*aa*, 39*aa* are positioned on the board portion 31*a*, that is, in proximity to an outer edge part of the base plate 21*a*.

The lower movable contact point 39*ba* is disposed at a position which is slightly spaced upper than those of the locking portions 38*a* in correspondence with the positions of the locking portions 38*a*.

The peripheral wall portion 32*a* is adapted to surround the airbag 23*a* in its folded state, and is positioned in a direction taken along the protrusion direction of the airbag 23*a*. Also, at the outside of the peripheral wall portion 32*a*, a plurality of engagement portions 51*a* for engaging and retaining the airbag cover 22*a* are provided all over the board portion 31*a*. Although, in the embodiment, the engagement portions 51*a* are opened, these engagement portions each may be formed in the shape of a hook or may be formed in the shape of a hook and in an opened state.

On the other hand, the airbag cover 22*a* shown in FIG. 14 or the like is integrally formed of a synthetic resin having its insulation property, and is provided with: a top plate portion 53*a* serving as a cover main body adapted to cover a front side of a part of the steering wheel 10*a*; and a mounting plate portion 54*a* serving as a mounting wall portion which is provided so as to be protrusive to a lower side in a rectangular cylinder shape from a front side which is a rear side of the top plate portion 53*a*.

On a front face which is the rear face of the top plate 53*a*, at a position which is surrounded by the mounting plate portion 54*a*, a tear line which is a tear-off target portion, although not shown, the tear line being formed in a small groove shape in thickness dimension, is formed in a substantial H-shape in a planar view, and at the time of inflation of the airbag, the airbag is configured to cleave and expand along the tear line by way of an expansion pressure of the airbag.

The mounting plate portion 54*a* is positioned outside of the peripheral wall portion 32*a* of the base plate 21*a*, and is formed along an external shape of the peripheral wall portion 32*a*. Further, at the mounting plate portion 54*a*, engagingly locking protrusions, although not shown, which are adapted to engage with the engagement portions 51*a* of the base plate 21, are respectively provided.

The airbag 23*a* is formed in a flat bag shape by single or a plurality of base cloths, for example, and as is the case with the board portion 31*a* of the base plate 21*a*, an inflator mounting hole 56*a* formed in the shape of a circular hole and four mounting holes 57*a* which are provided so as to surround the inflator mounting hole 56*a* are formed.

The inflator 25*a* is provided with: a disk-shaped inflator main body portion 61*a*; and a flange portion 62*a* which is provided so as to be protrusive from the inflator main body portion 61*a* to the outer circumferential side. In addition, in the inflator main body portion 61*a*, a gas injection nozzle, although not shown, is provided, and in the flange portion 62*a*, four mounting holes 64*a* are provided. Further, at a bottom part of the inflator main body portion 61*a*, a contact point, although not shown, is provided. To the contact point, a wire harness is connected via a connector, although not shown, and via the wire harness, the inflator 25*a* is electrically connected to a control device.

The retainer 26*a* is formed in the shape of a ring, and is provided with: a retainer base portion 66*a* which is formed of a metal plate or the like; and four mounting bolts 67*a* which are fixed to the retainer base portion 66*a*. Also, in the retainer base portion 66*a*, an inflator mounting hole 68*a* formed in the shape of a circular hole is shaped at a center part. In addition, the mounting bolts 67*a* are protrusively provided on a rear side so as to surround the inflator mounting hole 68*a*, and appropriate nuts, although not shown, are respectively screwed.

Also, the retainer 26*a* is inserted into the airbag 23*a*, and the airbag 23*a* is folded in a predetermined state in a state in which the mounting bolts 67*a* of the retainer 26*a* are pulled out from the mounting holes 57*a*. Further, the folded airbag 23*a* is covered with the airbag cover 22*a*, and an engagingly locking protrusion of the mounting plate portion 54*a* of the airbag cover 22*a* is pushed against the side of the base plate 21*a* while the protrusion is positioned at the engagement portion 51*a* of the peripheral wall portion 32*a* of the base plate 21*a* with the mounting bolts 67*a* of the retainer 26*a* being inserted into the mounting holes 35*a*. In this manner, the engagingly locking protrusion is inserted into and then engagingly locked with the engagement portion 51*a* and then the airbag cover 22*a* and the base plate 21*a* are fixed to each other with just one touch of a finger (snap-in).

Further, while the mounting bolts 67*a* that protrude to the rear side of the base plate 21*a* is inserted into the mounting holes 64*a*, the inflator 25*a* is combined from the rear side of the base plate 21*a*, and appropriate nuts are screwed and tightened with the mounting bolts 67*a*. In this state, a portion on the front side of the inflator main body portion 61*a* in which the gas injection nozzle of the inflator 25*a* has been provided is inserted into the airbag 23*a* through the inflator mounting hole 34*a*, and the module 11 a is constructed.

On the other hand, the steering wheel main body 12*a* shown in FIG. 14 and FIG. 15 is composed of: a rim portion (a ring portion) 71*a* which is formed in the shape of a circular ring; a boss portion (a mounting portion) 72*a* which is positioned inside of the rim portion 71*a*; and a plurality of, in the embodiment, three spoke portions 73*a* adapted to couple these rim portion 71*a* and boss portion 72*a* to each other.

Also, the steering wheel main body 12*a* is provided with: a metal-based cored bar 75*a*; and a soft covering portion 76*a* adapted to integrally cover a part of the cored bar 75a, and a rear side of the cored bar 75a is covered with the cover body 13.

The cored bar 75a corresponds to the rim portion 71a, the boss portion 72a, and two spoke portions 73a; the cored bar is provided with: a rim cored bar 81a; a boss cored bar 82a serving as a supporting portion; and spoke cored bars 83a serving as coupling portions; and the cored bar is formed so as to be substantially transversely symmetrical to each other as a whole. It is to be noted that a remaining spoke portion 73a is composed of a finisher 14a, for example.

The boss cored bar 82a is also referred to as a boss plate or a hub core or the like, and integrally has, at a center part, a cylindrical boss 85a which is engagingly fitted to a steering shaft. Also, in the boss cored bar 82a, the opening portions 44a and the fixed contact points 48a that constitute a horn switch device are respectively provided. Further, at a lower part of the boss cored bar 82a, there are protrusively provided protrusion receptacle portions 86a in which the locking receptacle portions 47a are provided. The protrusion receptacle portions 86a each have: arm portions 86aa, 86aa extending to a lower side from both sides at a lower part of the boss cored bar 82a; and a supporting portion 86ba which is adapted to couple these arm portions 86aa, 86aa in the transverse direction and in which the locking receiving portions 47a and the fixed contact points 48a are disposed.

The opening portions 44a are provided so as to pass through the boss cored bar 82a in a forward and backward direction which is a thickness direction, at positions which correspond to the hooks 37a, that is, at positions which are spaced at both of the left and right sides at an upper part of the boss cored bar 82a (at positions which is proximal to a proximal end of the spoke cord bar 83a). These opening portions 44a each are formed in the shape of a circular hole. Also, tip end sides of the hooks 37a are respectively inserted into these opening portions 44a.

A respective one of the wires 45a is also referred to as a "one touch" wire, and is formed of a wire rod (a piano wire) such as an elastically deformable metal. In the embodiment, the respective one of the wires 45a is provided with: a wire main body 91a which is a twisted coil spring and which serves as an engagement member main body wounded in a coil shape; a first arm 92a extending from the wire main body 91a in a linear shape along a tangential direction; and a second arm 93a extending from the wire main body 91a in a linear shape along the tangential direction forming an obtuse angle with respect to the first arm 92a; and further, at a tip end side of the first arm 92a, there are integrally provided: bent (V-shaped) locking portions 94a adapted to engage with recessed portions 71a of the hooks 37a of the module 11a so as to engagingly lock the hooks 37a; and an operating portions 95 for removing operation which is continuous between these locking portions 94a (FIG. 13(a)). The respective one of the wires 45a changes an angle between the first arm 92a and the second arm 93a from a natural state (a no-load state) to thereby produce a biasing load so as to restore the angle between the first arm 92a and the second arm 93a to the natural state by way of the wire main body 91a.

Also, in the respective one of the wires 45a, the wire main body 91a is retained by a first retaining portion 97a formed in the shape of a circular hole, the first retaining portion being provided so as to pass through the boss cored bar 82a in the front face to rear face direction, the first arm 92a is retained by a second retaining portion 98a which is protrusively provided on a front side of the boss cored bar 82a, and at a position of the operating portion 95a, the second arm 93a is hooked and retained in a state in which the second arm is exposed to a hooking retaining portion 99a which is opened in an arc shape with respect to the boss cored bar 82a and then the locking portions 94a are respectively exposed from the opening portions 44a.

At the positions that correspond to the locking portions 38a, that is, at the central lower parts in the transverse direction of the boss cored bar 82a, the locking receiving portions 47a each are provided so as to be protrusive in the shape of a claw from the boss cored bar 82a (a respective one of the protrusive receptacle portions 86a) to a lower side; the locking receiving portions engagingly lock the locking portions 38a in the front face to back face direction which is the direction of insertion of the hooks 37a into the opening portions 44a, and specifically, snap-fit them in the front face direction.

The fixed contact points 48a are formed of a member such as a metal having its electrical conductivity, and are disposed so as to be opposed to the movable contact points 39a on the side of the module 11a. That is, at the fixed contact points 48a, there are set: a one of upper fixed contact points 48aa, 48aa which are a pair of fixed contact points disposed at both of the left and right side parts at the upper part of the boss cored bar 82a and opposed to the upper movable contact points 39aa, 39aa; and a lower fixed point 48ba which is another fixed contact point disposed directly at the central lower part in the transverse direction, that is, above the locking receiving portion 47a of the protrusion receptacle portion 86a (the supporting portion 86ba) and opposed to the lower movable contact point 39ba. Therefore, the fixed contact points 48a are respectively disposed at both side parts and the lower part of the board portion 31a of the base plate 21a, and are disposed at apex positions of a virtual isosceles triangle when seen from a front side.

In so far as the steering wheel main body 12a is concerned, the cover body 13a is mounted to the steering wheel main body 12a while the cover body is combined and positioned from a rear side. After that, the boss 85a of the steering wheel main body 12a is engagingly fitted to the steering shaft and then is tightened and fixed with appropriate nuts, although not shown.

In so far as the steering wheel main body 12a is concerned, while the module 11a hooks the locking receiving portions 47a on the locking portions 38a (the engagingly locking target portions 38ba), the respective opening portions 44a and the respective hooks 37a are positioned and are pushed against each other from the front side. In this manner, the locking portion locking portions 94a of the wires 45a that are positioned in the respective opening portions 44a engage with the engagingly locking faces 4a of the recessed portions 41a of the hooks 37a (FIG. 13b). As a result, the module 11a engages with the steering wheel main body 12a at three portions, both sides and the lower side; and the module is snap-fitted and supported.

As a result, the module 11a is positionally restrained in a respective one of the forward and backward direction, the vertical direction; the transverse direction relative to the steering wheel main body 12a, the respective hooks 37a are snap-fitted in the front face direction by way of the wires 45a; and the locking portions 38a are snap-fitted in the front face direction by way of the locking receiving portions 47a.

In addition, in this state, the steering wheel main body 12a is guided along the front face to back face direction by way of the respective hooks 37a.

Also, for example, electrical wiring is provided for contact points of the inflator 25a, whereby the steering wheel 10a that is provided with the module 11a is constructed in a state in which the steering wheel is mounted to the steering shaft.

In so far as the thus constructed steering wheel 10a is concerned, operation at the time of cruising is carried out by the occupant at the driver's seat gripping and turning the rim portion 71a. In addition, the occupant pushes and operates the airbag cover 22a of the module 11a that is compatible with a pushing operation portion against the biasing loads of the respective horn springs 46a. In this manner, the module 11a is relatively guided to the front side (FIG. 13(b) and FIG. 13(c) by way of engagement between the respective hooks 37a and the respective opening portions 44a and by way of engagement between the locking portions 38a and the locking receiving portions 47a, and when any movable contact point 39a comes into contact with a fixed contact point 48a, the horn device on the vehicle body side is blown.

Also, when the module 11a is removed from the steering wheel main body 12a, a tool provided with a L-shape, for example, although not shown, is inserted into the operating portion 95a that is exposed from the hooking retaining portion 99a, the module is pulled in a direction which is opposite to that of the hook 37a, and the module is released from the recessed portions 41a. In this manner, the module is disengaged from the hooks 37a by way of the wires 45a, and the module 11a can be removed.

On the other hand, in case of a front face collision of a motor vehicle, a gas is rapidly injected from the inflator 25a into the airbag 23a and then the folded housed airbag 23a rapidly inflates. Then, by way of the inflation pressure of the airbag 23a, the airbag cover 22a cleaves along the tear line and then the protrusion opening of the airbag 23a is formed, and the airbag 23a protrudes from this protrusion opening and then inflates and expands in front of the occupant to thereby constrain and protect the occupant. At this time, from the protrusion opening, the module 11a is retained by the steering wheel main body 12a against the impact at the time of inflation and expansion of the airbag 23a because the respective hooks 37a are mainly engagingly locked by way of the respective wires 45a.

Thus, according to the fourth embodiment, the openings 44a and the hooks 37a are paired, and the module 11a is further engagingly locked with the steering wheel main body 12a by way of the locking portions 38a and the locking receiving portions 48a that are positioned between the pair of opening portions 44a, 44a and hooks 37a, 37a; and therefore, the number of parts of the wires 45a that are disposed in the opening portions 44a can be reduced, the assembling workload of the wires 45a can be restrained, and downsizing becomes possible in comparison with the case of setting three or more pairs of opening portions and hooks, for example, while engagingly locking the module 11a with the steering wheel main body 12a. In addition, the locking portions 38 can be mounted merely by engagingly locking them with the locking receiving portions 47a and then inserting the hooks 37a, 37a into the opening portions 44a, 44a; and therefore, the module 11a can be easily mounted. Further, the contact points 39a, 48a are provided in correspondence with a positional relationship between the locking portions 38 and the locking receiving portions 47a; and therefore, the operability in operation of bringing the contact points 39a, 48a of the horn device into contact with something is improved.

Furthermore, a pair of opening portions 44a, 44a and a pair of hooks 37a, 37a are disposed at both of the left and right side parts, and the locking portions 38a and the locking receiving portions 47a are disposed at the central lower part in the transverse direction. In this manner, the module 1a can be engagingly locked in a well-balanced manner and reliably with the steering wheel main body 12a, and at the time of a pushing operation of bringing the contact points 39a, 48a of the horn device into contact with something, a backlash of the module 11a is restrained, smooth operation is carried out, and its related operability can be improved more remarkably.

It is to be note that while, in the fourth embodiment described above, there has been employed a construction in which the hooks 37a are protrusively provided in the module 11a (the base plate 21a), and the opening portions 44a and the wires 45a are disposed in the steering wheel main body 12a (the boss cored bar 82a), there can also employed a construction in which the opening portions 44a and the wires 45a are disposed in the module 11a (the base plate 21a), and the hooks 37a are protrusively provided in the steering wheel main body 12a (the boss cored bar 82a).

Still furthermore, as the module 11a, there can be employed a pad body adapted to house a shock absorbing body, for example, the airbag device.

INDUSTRIAL APPLICABILITY

The present invention can be preferably employed as an airbag device for driver's seat of a motor vehicle, for example.

What is claimed is:

1. A steering wheel comprising:
   a steering wheel main body;
   a module;
   a pair of hole portions which are provided so as to be spaced from each other in either one of the steering wheel main body and the module;
   a pair of hooks which are provided so as to be spaced from each other in another of the steering wheel main body and the module and which can be respectively inserted into the hole portions;
   a pair of engagement portions which are disposed in the respective hole portions, which are biased in a predetermined direction crossing an insertion direction of the hooks into the hole portions, and which are engaged with the hooks that are inserted into the hole portions so as to retain the hooks to thereby support the module with respect to the steering wheel main body;
   a coil spring, one end of which is retained at a periphery of a proximal end side of a respective one of the hooks;
   a locking portion which is provided between either of the pair of the hole portions and the pair of the hooks in either one of the steering wheel main body and the module;
   a locking receiving portion which is provided in another of the steering wheel main body and the module and which is adapted to engagingly lock the locking portion in the insertion direction of the hooks into the hole portions; and
   a horn device which comprises: one contact point which is provided at least on either one of the steering wheel main body and the module at a position of the locking portion; and another contact point which is provided so as to be opposed to the one contact point in another of the steering wheel main body and the module, the horn device being blown by way of contact of the one and another contact points due to a relative movement of the module with respect to the steering wheel main body along the insertion direction of the hooks into the hole portion, wherein the pair of hole portions are positioned at both of the left and right side parts in either one of the steering wheel main body and the module, the pair of hooks are provided at a position which corresponds to the pair of hole portions in another of the steering wheel main body and the module, the locking portion is positioned at a central lower part in a transverse direction of either one of the steering wheel main body and the module, and is provided with a pair of protrusion portions which protrude along a direction parallel to the hooks and an engagingly locking target portion which is directly engagingly locked with the locking receiving portion while coupling tip end parts of the protrusion portions, and the locking receiving portion is provided to be protrusive in the shape of a claw at a position which corresponds to the locking portion in another of the steering wheel main body and the module.

\* \* \* \* \*